(12) United States Patent
Gilberto et al.

(10) Patent No.: US 7,937,296 B2
(45) Date of Patent: *May 3, 2011

(54) ORDER AND PAYMENT VISIBILITY PROCESS

(75) Inventors: John A. Gilberto, Alpharetta, GA (US); Dave Gittings, Roswell, GA (US)

(73) Assignee: United Parcel Service of America, Inc.

( * ) Notice: Subject to any disclaimer, the term of this patent is extended or adjusted under 35 U.S.C. 154(b) by 334 days.

This patent is subject to a terminal disclaimer.

(21) Appl. No.: 12/210,673

(22) Filed: Sep. 15, 2008

(65) Prior Publication Data

US 2009/0030811 A1    Jan. 29, 2009

Related U.S. Application Data

(62) Division of application No. 10/229,707, filed on Aug. 27, 2002, now Pat. No. 7,444,298.

(60) Provisional application No. 60/315,597, filed on Aug. 28, 2001.

(51) Int. Cl.
G06Q 30/00        (2006.01)
(52) U.S. Cl. .................. 705/26.41; 705/26.1; 705/26.81
(58) Field of Classification Search ................ 705/1, 26, 705/27, 500, 26.1, 26.41, 26.8, 26.81, 27.1
See application file for complete search history.

(56) References Cited

U.S. PATENT DOCUMENTS

| | | |
|---|---|---|
| 4,799,156 A | 1/1989 | Shavit et al. |
| 4,958,280 A | 9/1990 | Pauly et al. |
| 4,992,940 A | 2/1991 | Dworkin |
| 5,315,508 A | 5/1994 | Bain et al. |
| 5,375,240 A | 12/1994 | Grundy |
| 5,592,378 A | 1/1997 | Cameron et al. |
| 5,666,493 A | 9/1997 | Wojcik et al. |
| 5,694,551 A | 12/1997 | Doyle et al. |
| 5,710,887 A | 1/1998 | Chelliah et al. |
| 5,842,178 A | 11/1998 | Giovannoli |
| 5,895,454 A | 4/1999 | Harrington |
| 5,970,475 A | 10/1999 | Barnes et al. |
| 5,971,587 A | 10/1999 | Kato et al. |
| 5,987,429 A | 11/1999 | Maritzen et al. |
| 5,999,913 A | 12/1999 | Goodwin, III |
| 6,006,199 A | 12/1999 | Berlin et al. |
| 6,016,504 A | 1/2000 | Arnold et al. |

(Continued)

FOREIGN PATENT DOCUMENTS

CA    2140.244    12/1994

(Continued)

OTHER PUBLICATIONS

Van Huizen, G., "Messaging: The Transport Part of the XML Puzzle," Jul. 2000 (retrieved from the Internet Apr. 25, 2003, http://www-106.ibm.com/developerworks/library/xml-messaging/.*

(Continued)

*Primary Examiner* — Nicholas D Rosen
(74) *Attorney, Agent, or Firm* — Alston & Bird LLP

(57) ABSTRACT

The present invention discloses systems and methods for facilitating order entry, fulfillment, shipment and payment in a networked environment. In a preferred embodiment, the present invention describes a system for communicating order entries from a seller to a supplier, while providing order status information to the buyer. Also, according to a preferred embodiment of the present invention, a system and method for electronic invoice presentment, dispute resolution and payment in a networked environment is described.

12 Claims, 48 Drawing Sheets

U.S. PATENT DOCUMENTS

| | | | |
|---|---|---|---|
| 6,047,264 | A | 4/2000 | Fisher et al. |
| 6,058,373 | A | 5/2000 | Blinn et al. |
| 6,208,980 | B1 | 3/2001 | Kara |
| 6,220,509 | B1 | 4/2001 | Byford |
| 6,236,972 | B1 | 5/2001 | Shkedy |
| 6,263,317 | B1 | 7/2001 | Sharp et al. |
| 6,285,916 | B1 | 9/2001 | Kadaba et al. |
| 6,343,275 | B1 | 1/2002 | Wong |
| 6,356,196 | B1 | 3/2002 | Wong et al. |
| 6,460,020 | B1 | 10/2002 | Pool et al. |
| 6,463,420 | B1 | 10/2002 | Guidice et al. |
| 6,594,641 | B1 | 7/2003 | Southam |
| 6,671,673 | B1 | 12/2003 | Baseman et al. |
| 7,003,474 | B2 | 2/2006 | Lidow |
| 7,184,973 | B2 | 2/2007 | Monteleone et al. |
| 7,444,298 | B2 * | 10/2008 | Gilberto et al. .......... 705/26 |
| 7,496,525 | B1 * | 2/2009 | Mitchell .......... 705/26 |
| 7,610,218 | B2 * | 10/2009 | Bodmer et al. .......... 705/26 |
| 2002/0010634 | A1 | 1/2002 | Roman et al. |
| 2002/0013744 | A1 | 1/2002 | Tsunenari et al. |
| 2002/0016726 | A1 | 2/2002 | Ross |
| 2002/0019761 | A1 | 2/2002 | Lidow |
| 2002/0032612 | A1 | 3/2002 | Williams et al. |
| 2002/0032668 | A1 | 3/2002 | Kohler et al. |
| 2002/0073039 | A1 | 6/2002 | Ogg et al. |
| 2002/0087465 | A1 | 7/2002 | Ganesan et al. |
| 2002/0111892 | A1 | 8/2002 | Sharp et al. |
| 2002/0152133 | A1 | 10/2002 | King et al. |
| 2002/0154017 | A1 | 10/2002 | Farner |
| 2003/0046220 | A1 | 3/2003 | Kamiya |
| 2003/0093321 | A1 | 5/2003 | Bodmer et al. |
| 2004/0059596 | A1 | 3/2004 | Vaidyanathan et al. |
| 2004/0243483 | A1 | 12/2004 | Baumann et al. |

FOREIGN PATENT DOCUMENTS

| | | |
|---|---|---|
| CA | 2384182 | 1/2002 |
| CA | 2441053 | 9/2002 |
| JP | 06290193 A | 10/1994 |
| JP | 10049607 A | 2/1998 |
| JP | 2000016535 A | 1/2000 |
| WO | WO 99/33016 | 7/1999 |
| WO | WO 99/34272 | 7/1999 |
| WO | WO 00/30014 A1 | 5/2000 |
| WO | WO 00/38095 | 6/2000 |
| WO | WO 00/46726 | 8/2000 |
| WO | WO 00/46728 | 8/2000 |
| WO | WO 01/16889 A1 | 3/2001 |
| WO | WO 01/29778 A1 | 4/2001 |
| WO | WO 01/35344 A2 | 5/2001 |
| WO | WO 01/65454 A2 | 9/2001 |
| WO | WO 01/67344 A1 | 9/2001 |
| WO | WO 01/72109 A2 | 10/2001 |
| WO | WO 01/88831 A2 | 11/2001 |
| WO | WO 02/07104 A1 | 1/2002 |
| WO | WO 02/17045 A2 | 2/2002 |
| WO | WO 02/052378 A2 | 7/2002 |
| WO | WO 2004/114089 | 12/2004 |

OTHER PUBLICATIONS

Brewin, Bob and Rosencrance, Linda, Follow That Package!, Article, Mar. 19, 2001 (Retrieved from the Internet Apr. 25, 2003), p. 1-p. 5, Retrieved from the Internet: URL:http://www.computerworld.com./printthis/2001/0,4814,58696,00.html, Computer World.

De Marco, Donna, E-Tail Presents Can Be Tougher to Send Back Than Order, Journal, Dec. 28, 1999, Downloaded from the Internet on Oct. 3, 2002, Accession No. 08891512, Knight-Ridder/Tribune Business News, The Dialog Corporation, United States.

El Portal Del Transporte, FedEx Insight Empowers Customers with Enhanced Shipment Visibility and Control, Article, Apr. 11, 2001 (Retrieved on Apr. 25, 2003), p. 9, Paragraph 4-p. 10, Line 7, Retrieved from the Internet: <URL:http://www.transportando.net/newsabri1_completa.htm>.

Frontline Solutions, FedEx Improves Internal, External Operations, Article, Apr. 5, 2001 (Retrieved from the Internet Apr. 25, 2003), p. 1 (last line) through p. 2, Paragraph 9, Retrieved from the Internet: <URL:http://www.frontlinemagazine.com/art_th/o4052001.htx>, Fairfax, Virginia and Memphis, Tennessee.

Harrington, Lisa, The U.S. Postal Service Gets Serious About Serving Business in the New Economy, Journal, May 2000, Downloaded from the Internet on Oct. 3, 2002, p. 2, vol. 41, No. 5, Accession No. 01167257, Penton Publishing, Inc., United States of America.

Henderson, Timothy, Buy.com Boosts Returns Process Efficiency With New Solution, Periodical, Nov. 2000,Downloaded from the Internet on Oct. 3, 2002, pp. 72-76, vol. 82n11, Accession No. 02102731, ProQuest Info & Learning, United States of America.

Many Happy Returns—UPS Unveils Advanced Outline Returns Solution, Journal, Sep. 20, 2000, Downloaded from the Internet on Oct. 3, 2002, Accession No. 12921102, Business Wire, United States of America.

Pender, Lee, Hard Times Are The Best Times, Magazine, Aug. 15, 2001 (Retrieved on Apr. 25, 2003), p. 3, Paragraph 3, Retrieved from the Internet: <URL:http://www.cio.com/archive/081501/besttimes_content.html>.

Anon, "*Baking and Snack Food Companies, Supermarkets Adopt DEX/UCS*," Milling and Baking News, vol. 69, No. 31, p. 7A(3), Oct. 2, 1990.

Anon, "*Conquering the Next E-Billing Frontier*," PR Newswire, p. 0320, Jun. 14, 2000.

Donovan, W.J., "Something New For Antique Lovers," Providence Journal, p. F-01, Mar. 24, 2000.

Van Huizen, Gordon, Messaging: The Transport Part of The XML Puzzle, Article, Jul. 2000 (Retrieved from the Internet Apr. 25, 2003: <URL:http://www-106.ibm.com/developerworks/library/xml-messaging/>.

* cited by examiner

| Vendorship.com | | | Vendorship |
|---|---|---|---|
| Main Menu  Orders | Help | Administration | Logout |

WELCOME TO VENDORSHIP.COM'S HELP SECTION

This section is devoted to helping you find the answers to your questions. Thank you for using Vendorship.com!

What is Vendorship.com and Our Mission (click here)

Help Features

FAQ - Get answers to frequently asked questions

Contact Us - Email or toll free at 1 800 555 5555

New Features - Check out new features of Vendorship.com

Glossary - Glossary of Terms

Site Map

Common Processes

Customer Service Representative

1. How do I create a new order?
2. How do I edit an existing order?
3. How do I void an order?
4. How do I change my user information?
5. How do I find an existing order?
6. How do I view information about an order?
7. How do I track a package?
8. How do I view order notes?
9. How do I exit the system?

FIG. 6.

FROM FIG. 7A

Step 3
This page will give you details about the order. This includes information about who shipped the order, where the order is going, and what the order contains. You can return to the Order Listing page by clicking on the Return to Shipping link.

Click here for more details

RETURN TO MAIN PAGE

FIG. 7B

ORDER LISTING

VendorShip.com | Main Menu | Orders | Help | Administration | Logout | Vendorship Reset View to Show: Open, Partial, Shipped, All Search Past ○ 1 ○ 7 ○ 30 ● 180 Days    ○ or Date Range [mm/dd/yyyy] to [ ]    [Lookup▼]

1 2 3 4    Showing 1 of 61

| ID | ▼Order▲ | ▼Status▲ | ▼Order Date▲ | ▼Supplier▲ | ▼Location▲ |
|----|---------|----------|--------------|------------|------------|
| 1 | 111222333 | Shipped | 6/5/2001 | Supplier Company | |
| 2 | 1702323 | Open | 6/4/2001 | Harry's Hobby Shop | check it out |
| 3 | x0987 | Open | 6/4/2001 | Conway Tool Supply | LocoRef0987 |
| 4 | 2424 | Open | 6/4/2001 | Company 1 | |
| 5 | 2420 | Shipped | 6/4/2001 | Supplier Company | |
| 6 | 11111 | Shipped | 6/4/2001 | Supplier Company | |
| 7 | 789 | Partial | 6/4/2001 | Supplier Company | |
| 8 | 777 | Partial | 5/31/2001 | Supplier Company | |
| 9 | Testing123 | Shipped | 5/30/2001 | Supplier Company | Atlanta |
| 10 | 1111 | Shipped | 5/18/2001 | Supplier Company | |

FROM FIG. 8A.

| | | | | |
|---|---|---|---|---|
| 11 | 567 | Shipped | 5/18/2001 | Supplier Company | |
| 12 | 5161312 | Shipped | 5/16/2001 | Supplier Company | |
| 13 | 5161327 | Open | 5/16/2001 | Veronica Shoe Company | San Francisco |
| 14 | 5161329 | Open | 5/16/2001 | Veronica Shoe Company | Denver |
| 15 | 12345 | Shipped | 5/15/2001 | Supplier Company | terminal #133 |
| 16 | abcde | Open | 5/11/2001 | Company 1 | |
| 17 | 9999 | Open | 5/9/2001 | Baja Celular Mexicana,SA de CV | |
| 18 | 12345 | Shipped | 5/9/2001 | Supplier Company | |
| 19 | NMD01 | Shipped | 5/8/2001 | Veronica Shoe Company | Houston |
| 20 | 555 | Shipped | 5/8/2001 | Supplier Company | |

FIG. 8B.

ORDER LISTING

*VendorShip.com*

Main Menu | Orders | Help | Administration | Logout

Vendorship

Search Past ○ 1 ○ 7 ○ 30 ● 180 Days    Or Date Range [mm/dd/yyyy] to [        ]    Reset View to Show: Open, Partial, Shipped, All    [▼Lookup]

Showing 1 of 17

| ID | ▼Order | ▼Status | ▼Order Date | ▼Supplier | ▼Location |
|----|--------|---------|-------------|-----------|-----------|
| 1 | 1702323 | Open | 6/4/2001 | Harrys Hobby Shop | check it out |
| 2 | x0987 | Open | 6/4/2001 | Conway Tool Supply | LocoRef0987 |
| 3 | 5161327 | Open | 5/16/2001 | Veronica Shoe Company | San Francisco |
| 4 | 5161329 | Open | 5/16/2001 | Veronica Shoe Company | Denver |
| 5 | abcde | Open | 5/11/2001 | Company 1 | |
| 6 | 9999 | Open | 5/9/2001 | Baja Celular Mexicana,SA de CV | |
| 7 | BobTest | Open | 5/4/2001 | Tim's Golf Shop | Atlanta |
| 8 | 123 | Open | 5/4/2001 | Jan company | |
| 9 | dt 03-26-01 | Open | 3/26/2001 | Harrys Hobby Shop | Dallas |
| 10 | drt.03/26/01 | Open | 3/26/2001 | Harrys Hobby Shop | Houston |

FROM FIG. 9A.

| 11 | dan03/26/01 | Open | 3/26/2001 | Veronica Shoe Company | Memphis |
| 12 | 123456478901 | Open | 3/6/2001 | Jan company | |
| 13 | 11111 | Open | 3/5/2001 | Veronica Shoe Company | San Francisco |
| 14 | 305011004 | Open | 3/5/2001 | Harrys Hobby Shop | |
| 15 | 305011014 | Open | 3/5/2001 | Harrys Hobby Shop | OH707 |
| 16 | 305011019 | Open | 3/5/2001 | Conway Tool Supply | VA502 |
| 17 | 44444 | Open | 3/5/2001 | Veronica Shoe Company | San Francisco |

FIG. 9B.

*VendorShip.com* | Vendorship

Main Menu     Orders     Help     Administration     Logout

ORDER LISTING

Reset View to Show: Open, Partial, Shipped, All

Search Past: ○ 1 ○ 7 ○ 30 ● 180 Days     ○ or Date Range [ ] to [ ] mm/dd/yyyy     Lookup Showing 1 of 5

| ID | ▼ Order ▲ | ▼ Status ▲ | ▼ Order Date ▲ | ▼ Supplier ▲ | ▼ Location ▲ |
|---|---|---|---|---|---|
| 1 | 789 | Partial | 6/4/2001 | Supplier Company | |
| 2 | 777 | Partial | 5/31/2001 | Supplier Company | |
| 3 | B05041500 | Partial | 5/4/2001 | Tim's Golf Shop | |
| 4 | gsp05041340 | Partial | 5/4/2001 | Tim's Golf Shop | |
| 5 | 305011002 | Partial | 3/5/2001 | Veronica Shoe Company | Santa Cruz |

FIG. 10

VendorShip.com

| Main Menu | Orders | Help | Administration | Logout |

ORDER LISTING

Reset View to Show: Open, Partial, Shipped, All

Search Past: ○ 1  ● 7  ○ 30  ○ 180 Days     ○ or Date Range [    ] to [    ] mm/dd/yyyy     ◄ Lookup 12                                                                                  Showing 1 of 38

| ID | ▼ Order ▲ | ▼ Status ▲ | ▼ Order Date ▲ | ▼ Supplier ▲ | ▼ Location ▲ |
|---|---|---|---|---|---|
| 1 | 111222333 | Shipped | 6/5/2001 | Supplier Company | |
| 2 | 2420 | Shipped | 6/4/2001 | Supplier Company | |
| 3 | 11111 | Shipped | 6/4/2001 | Supplier Company | |
| 4 | Testing123 | Shipped | 5/30/2001 | Supplier Company | Atlanta |
| 5 | 11111 | Shipped | 5/18/2001 | Supplier Company | |
| 6 | 567 | Shipped | 5/18/2001 | Supplier Company | |
| 7 | 5161312 | Shipped | 5/16/2001 | Supplier Company | |
| 8 | 12345 | Shipped | 5/15/2001 | Supplier Company | terminal#133 |
| 9 | 12345 | Shipped | 5/9/2001 | Supplier Company | |
| 10 | NMD01 | Shipped | 5/8/2001 | Veronica Shoe Company | Houston |
| 11 | 555 | Shipped | 5/8/2001 | Supplier Company | |
| 12 | Reggie2001 | Shipped | 5/8/2001 | Veronica Shoe Company | |
| 13 | jm2001 | Shipped | 5/4/2001 | Supplier Company | |
| 14 | jm2002 | Shipped | 5/4/2001 | Supplier Company | |
| 15 | 546 | Shipped | 5/4/2001 | Supplier Company | |

| | | | | |
|---|---|---|---|---|
| 16 | MRO05042230 | Shipped | 5/3/2001 | Supplier Company |
| 17 | 050301433 | Shipped | 5/3/2001 | Supplier Company |
| 18 | vov1234 | Shipped | 5/3/2001 | Supplier Company |
| 19 | staples | Shipped | 5/2/2001 | Supplier Company |
| 20 | marc1 | Shipped | 5/1/2001 | Supplier Company |

FROM FIG. 10A

New Order

Customer Number* [063000]   Retrieve Customer Information

*indicates required field

FIG. 11

VendorShip

Customer Information: New Customer

Customer Number 063000

| | | | |
|---|---|---|---|
| Company* | Needit Now Inc. | Telephone Number | (123) 456-7890 |
| Attention/Name | Mr. Needitnow | Extension | |
| Address 1* | 123 Main St. | Fax Number | |
| Address 2 | | E-Mail | |
| City* | Atlanta | | |
| State* | Georgia ▼ | | |
| Zip* | 30303 | | |

Submit Cancel

*Indicates required field

VendorShip.com | Vendors

Main Menu    Orders    Help    Administration    Logout

GLOSSARY OF TERMS

Here you will find a glossary of terms that will help you understand acronyms and objects that may not be clearly defined within Vendorship.com.

ABCDEFGHIJKLMNOPQRSTUVWXYZ#    Return to Main Help Page

A

Address 1                                                     Top of Page

- Primary line of the company's address

Address 2                                                     Top of Page

- Secondary line of the company's address.

Attention                                                     Top of Page

- Person who should be contacted upon shipment.

B

Top of Page

-

C

City                                                         Top of Page

- City of the company's address.

FIG. 14

HOW DO I CREATE A NEW ORDER?

Step 1
From the Main Menu select the New Order link.

Click here for more details

Step 2
Enter all order information into all the necessary and applicable fields before selecting the Continue link.

Click here for more details

Step 3
If you do have line items associated with this order please proceed to Step 4. If there are no line items associated with this order, confirm by selecting Continue.

Click here for more details

FIG. 15

LINE ITEMS FOR ORDER 10010

VendorShip.com

Main Menu | Orders | Help | Administration | Logout

Vendorship

| Line | Line Item ID | SKU/Item #* | Quantity* | Description | Reference |
|---|---|---|---|---|---|
| 1 | 100 | 188 | 2 | widget | |
| 2 | 200 | 189 | 1 | widget holder | |

*If there are no line items for this order, please hit the "Edit Order Information" button and change the "Line Items" field to "0".

Continue    Edit Order Information

ORDER CONFIRMATION

*VendorShip.com* — Vendorship

Main Menu | Orders | Help | Administration | Logout

New Order Details

| | | | |
|---|---|---|---|
| Order Number | 10010 | Supplier | Supplier Company |
| Reference Number | 24 | Date Ordered | 06/06/2001 |
| Customer PO Number | 1000000024 | Date Requested | 07/01/2001 |
| Shipping Method | UPS Ground | | |
| Location Reference | | | |

Customer Information:

Ship To Information

| | | | |
|---|---|---|---|
| Company Name | Needit Now, Inc | | Contact Information |
| Address 1 | 123 Main St. | Attention | Mr. Impatient |
| Address 2 | | Phone | (123) 456-7890 x 1 |
| City | Atlanta | Fax | |
| State, Zip | GA, 30303 | Email | MrI@needitnow.com |

Line Item Information

| Line | Line Item ID | SKU | Quantity | Description | Reference |
|------|--------------|-----|----------|-------------|-----------|
| 1 | 100 | 188 | 2 | widget | |
| 2 | 200 | 189 | 1 | widget holder | |

[Continue]   [Edit Order]

ORDER LISTING

Reset View to Show: Open, Partial, Shipped, All

Search Past: ○ 1 ○ 7 ○ 30 ● 180 Days    Or Date Range [mm/dd/yyyy] to [ ]    [Lookup]

Showing 1 of 62

| ID | ▼Order▲ | ▼Status▲ | ▼Order Date▲ | ▼Supplier▲ | ▼Location▲ |
|----|---------|----------|--------------|------------|------------|
| 1  | 10010 | Open | 6/6/2001 | Supplier Company | |
| 2  | 111222333 | Shipped | 6/5/2001 | Supplier Company | |
| 3  | 1702323 | Open | 6/4/2001 | Harrys Hobby Shop | check it out |
| 4  | x0987 | Open | 6/4/2001 | Conway Tool Supply | LocoRef0987 |
| 5  | 2424 | Open | 6/4/2001 | Company 1 | |
| 6  | 2420 | Shipped | 6/4/2001 | Supplier Company | |
| 7  | 11111 | Shipped | 6/4/2001 | Supplier Company | |
| 8  | 789 | Partial | 6/4/2001 | Supplier Company | |
| 9  | 777 | Partial | 5/31/2001 | Supplier Company | |
| 10 | Testing123 | Shipped | 5/30/2001 | Supplier Company | Atlanta |
| 11 | 1111 | Shipped | 5/18/2001 | Supplier Company | |

|    |        |         |           |                            |              |
|----|--------|---------|-----------|----------------------------|--------------|
| 12 | 567    | Shipped | 5/18/2001 | Supplier Company           |              |
| 13 | 5161312| Shipped | 5/16/2001 | Supplier Company           |              |
| 14 | 5161327| Open    | 5/16/2001 | Veronica Shoe Company      | San Francisco|
| 15 | 5161329| Open    | 5/16/2001 | Veronica Shoe Company      | Denver       |
| 16 | 12345  | Shipped | 5/15/2001 | Supplier Company           | terminal #133|
| 17 | abcde  | Open    | 5/11/2001 | Company 1                  |              |
| 18 | 9999   | Open    | 5/9/2001  | Baja Celular Mexicana,SA de CV |          |
| 19 | 12345  | Shipped | 5/9/2001  | Supplier Company           |              |
| 20 | NMD01  | Shipped | 5/8/2001  | Veronica Shoe Company      | Houston      |

FROM FIG. 19A

FIG. 19B

*VendorShip.com*                                                                    Vendorship

| Main Menu | Orders | Help | Administration | Logout |

ORDER LISTING
Reset View to Show: Open, Partial, Pending, Shipped, All

Search Past: ○ 1 ○ 7 ○ 30 ● 180 Days    ○ or Date Range [mm/dd/yyyy] to [_____]    ▼Lookup

[1]    Showing 1 of 1

| ID | ▼Order▲ | ▼Status▲ | ▼Order Date▲ | ▼Customer▲ | ▼Location▲ |
|----|---------|----------|--------------|------------|------------|
| 1  | 2420    | Open     | 6/4/2001     | Widgets R Us |          |

ORDER LISTING

*VendorShip.com*

Main Menu | Orders | Help | Administration | Logout

Reset View to Show: Open, Partial, Pending, Shipped, All

Search Past ○ 1  ● 7  ○ 30  ○ 180 Days        O or Date Range [mm/dd/yyyy] to [_____]  ◀ Lookup Showing 1 of 4

| ID | ▼ Order ▲ | ▼ Status ▲ | ▼ Order Date ▲ | ▼ Customer ▲ | ▼ Location ▲ |
|----|-----------|-----------|----------------|--------------|--------------|
| 1  | 111222333 | Shipped   | 6/5/2001       | Jeff Reid    |              |
| 2  | 2420      | Shipped   | 6/4/2001       | Widgets R Us | ups          |
| 3  | 11111     | Shipped   | 6/4/2001       |              |              |
| 4  | Testing123| Shipped   | 5/30/2001      | Accenture    | Atlanta      |

FIG. 24

ORDER LISTING

*VendorShip.com*  *Vendorship*

Main Menu | Orders | Help | Administration | Logout

Reset View to Show: Open, Partial, Shipped, All

Search Past: ○ 1 ○ 7 ○ 30 ● 180 Days  O or Date Range [ mm/dd/yyyy ] to [ ] ◄Lookup 1 2 3 4                                              Showing 1 of 62

| ID | ▼Order▲ | ▼Status▲ | ▼Order Date▲ | ▼Supplier▲ | ▼Location▲ |
|----|---------|----------|--------------|-----------|------------|
| 1  | 100101  | Pending  | 6/6/2001     | Supplier Company | |

FIG. 25

| VendorShip.com | | | | | Vendors |
|---|---|---|---|---|---|
| Main Menu | Orders | Help | Administration | | Logout |

SHIP ORDER 10010

Package Information

| | | | Ship To Information |
|---|---|---|---|
| Weight* | | | Needit Now, Inc |
| Service* | UPS Ground | | Mr. Impatient |
| Dimensions | L: W: H: in. | | 123 Main St. |
| Requirements | ☐ Oversize ☐ Sat Delivery | | Atlanta, GA 30303 |
| Declared Value | $ | | |
| Number of Packages* | 1 of 1 | | Ship Order |
| Manually Enter UPS Tracking# | 1Z | | View Order Details |

LTL Information

| | | Enter Different Order |
|---|---|---|
| LTL Pro Tracking Number | | |
| LTL Shipment Description | | Add Order Notes |
| LTL Carrier Instructions | | |
| LTL Package Description | | |
| LTL Class | 60 | |
| LTL BOL Number | | |

*indicates required field

FIG. 26

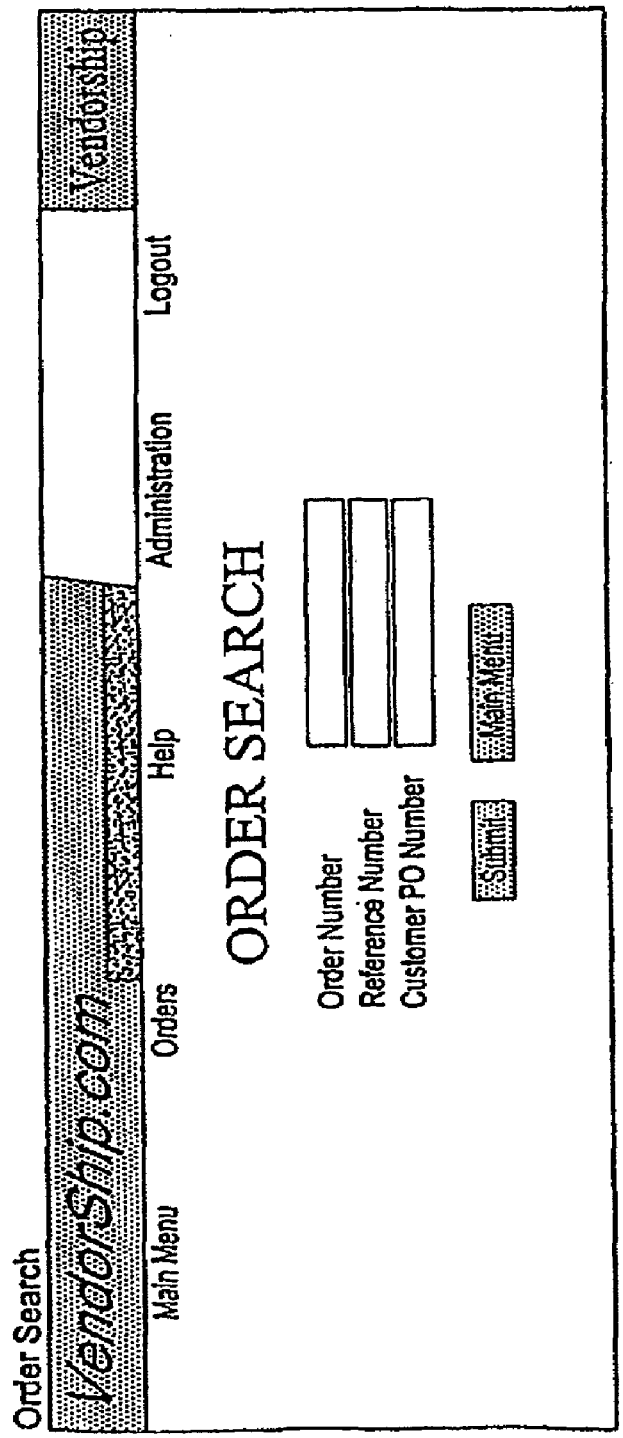

Supplier

Supplier Company
Attention: Supplier Contact
456 Supplier Ln
Nashville, TN 37235
Phone: (615) 421-0000 x4321
Fax: (615) 421-0001

Order Number: 10010

Order Status: Open

View Order Notes

Ship To

Needit Now, Inc
Attention: Mr. Impatient
123 Main St.
Atlanta, GA 30303
Phone: (123) 456-7890 x1
Fax: Not Provided Close Window

| PO Number | Reference Number | Date Ordered | Date Requested | Location Reference |
|---|---|---|---|---|
| 1000000024 | 24 | 06/06/2001 | 07/01/2001 | |

Line Item Information:

| Line | SKU | Qty. | Shipped | Left | Description | Reference |
|---|---|---|---|---|---|---|
| 1 | 188 | 2 | 0 | 2 | widget | |
| 2 | 189 | 1 | 0 | 1 | widget holder | |

Package Information:

There are no packages associated with this order

Close Window

FIG. 28

SHIP LINE ITEMS FOR ORDER 10010

| Line | SKU | Description | Reference | Quantity | Shipped | Remaining | Ship* |
|------|-----|-------------|-----------|----------|---------|-----------|-------|
| 1 | 188 | widget | | 2 | 0 | 2 | 2 |
| 2 | 189 | widget holder | | 1 | 0 | 1 | 1 |

\* Do NOT click the 'Ship Order' button more than once. Items can be repeatedly shipped.

\* If the shipping method is UPS, the label should appear within 10-20 seconds.

[Ship Order]  [Edit Shipment]

FIG. 29

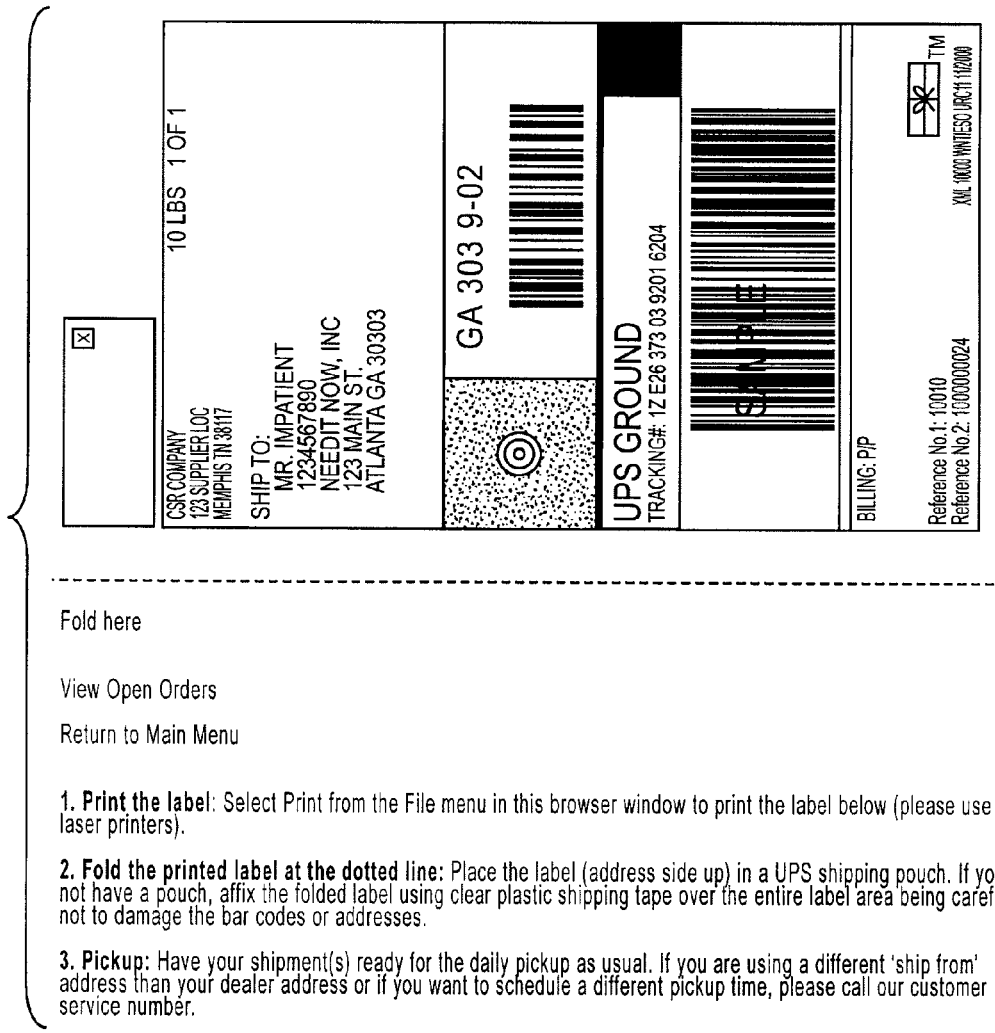

Fold here

View Open Orders

Return to Main Menu

1. Print the label: Select Print from the File menu in this browser window to print the label below (please use only laser printers).

2. Fold the printed label at the dotted line: Place the label (address side up) in a UPS shipping pouch. If you do not have a pouch, affix the folded label using clear plastic shipping tape over the entire label area being careful not to damage the bar codes or addresses.

3. Pickup: Have your shipment(s) ready for the daily pickup as usual. If you are using a different 'ship from' address than your dealer address or if you want to schedule a different pickup time, please call our customer service number.

FIG. 30

ORDER LISTING

*VendorShip.com*

Main Menu | Orders | Help | Administration | Logout

Reset View to Show: Open, Partial, Pending, Shipped, All

Search Past: ○ 1 ○ 7 ○ 30 ○ 180 Days    O or Date Range [mm/dd/yyyy] to [ ]    ◄ Lookup Showing 0 of 0

| ID | ▼Order▲ | ▼Status▲ | ▼Order Date▲ | ▼Customer▲ | ▼Location▲ |

There are currently no orders that match the parameters specified. Try adjusting the date range.

FIG. 31

ORDER LISTING

VendorShip.com | Main Menu | Orders | Help | Administration | Logout

Vendorship

Reset View to Show: Open, Partial, Pending, Shipped, All

Search Past: ○ 1 ○ 7 ○ 30 ● 180 Days    O or Date Range [mm/dd/yyyy] to [ ]    [ ] ◄Lookup

[ 1 ]    Showing 1 of 3

| ID | ▼Order▲ | ▼Status▲ | ▼Order Date▲ | ▼Customer▲ | ▼Location▲ |
|----|---------|----------|--------------|------------|------------|
| 1  | 10010   | Partial  | 6/6/2001     | Needit Now, Inc | UPS |
| 2  | 789     | Partial  | 6/4/2001     |            | UPS |
| 3  | 777     | Partial  | 5/31/2001    |            |     |

FIG. 32

Administrator User

VendorShip.com

| Main Menu | Orders | Help | Administration | Logout |

ADD NEW USER

Name*
Login Name*
Password*
Verify Password*

Email Address
Location*
User Active* ☑
Administrator ☐ ANN CSR

Submit  Undo Changes

FIG. 36

Add/Edit Location

*VendorShip.com*

| Main Menu | Orders | Help | Administration | Logout |

ADD NEW LOCATION

Select Company* [CSR Company ▼]

Location Description* [          ]  Phone & Ext.* [          ]
Address 1*           [          ]  Fax            [          ] x [   ]
Address 2            [          ]  Contact Name*  [          ]
City*                [          ]  Printer Type*  [Laser Printer ▼]
State*               [-None- ▼]    Account #1*    [          ] (Bill-to:)
Zip Code*            [          ]  Account #2*    [          ] (Suppliers:)

[Submit]  [Undo Changes]

FIG. 37

Add/Edit Company

VendorShip.com

Main Menu | Orders | Help | Administration | Logout

ADD NEW COMPANY

Company Name*
Address 1*
Address 2
City*
State* -None-
Zip Code*
Supplier Code*
Phone & Ext.*
Fax Contact Name*
Contact Email
Notification Method -No Notification-
Company Type* Supplier
Support Phone
Support Email
Company XML URL
Return Address Label

*To add a new location with the same information as this company, fill out the following
Add Location ☐ Location Name Submit  Undo Changes

FIG. 38

ORDER AND PAYMENT VISIBILITY PROCESS

CROSS-REFERENCE TO RELATED APPLICATIONS

This application is a division of U.S. application Ser. No. 10/229,707, filed Aug. 27, 2002, now U.S. Pat. No. 7,444,298, which is hereby incorporated herein in its entirety by reference. U.S. application Ser. No. 10/229,707 further claims the benefit of U.S. Provisional Application No. 60/315,597, filed Aug. 28, 2001, which is also hereby incorporated herein in its entirety by reference.

FIELD OF THE INVENTION

The present invention relates generally to methods and apparatuses for facilitating order entry in a network environment, and more particularly relates to methods and apparatuses for communicating, in a network environment, order entries from a seller to a supplier, providing for efficient shipment of the orders by the supplier and providing order status to the seller. The present invention also includes such methods and apparatus used in combination with other methods and apparatuses which include electronic invoice presentment and payment.

BACKGROUND OF THE INVENTION

Recently, the Internet, or particularly the "World Wide Web" has been of particular interest in the provision of commerce, and has given rise to a widespread desire to engage in "e-commerce". For background purposes World Wide Web (WWW), is a collection of globally distributed text and multimedia documents and files and other network services linked in such a way as to create an immense electronic library from which information can be retrieved quickly by intuitive searches. The Web represents the application of hypertext technology and a graphical interface to the Internet to retrieve information that is contained in specially formatted documents that may reside in the same computer or be distributed across many computers around the world. Currently, the Web's functionality is based on three main elements: HTML, HTTP and URL. Hypertext Markup Language (HTML) comprises the programming codes, or tags, that define fonts, layouts, embedded graphics, and links (hyperlinks) to other documents accessible via the Web. HyperText Transfer Protocol (HTTP) defines a set of standards for transmitting Web pages across the Internet. Universal Resource Locator (URL) is a standardized naming convention for identifying a Web document or file, in a sense the address of a link. The result is called the "Web" because it is made up of many sites, all linked together, with users traveling from one site to the next by selecting appropriate hyperlinks.

Web sites, also called Web pages, are really Internet sites that all use the same techniques and HTML tags to create multimedia documents with hypertext links. Each Web page can contain many screens or printed pages of text, graphics, audio, and even video, and the starting point for any Web site is called its home page. Although each page is an Internet site, it must be accessed via a special program called a Web browser, which can translate the HTML into the graphical images, text, and hypertext links intended by the creator of the page.

As acceptance of the Internet has become widespread, it may be seen that the Internet has a great capacity to allow interaction between various individuals and entities.

The present invention also has a general background relating to a business practice that involves four entities: a Customer, a Seller, a Supplier, and a Carrier/Shipper. In the most typical business model the Customer initially contacts the Seller and inquires regarding availability of a product. The Seller locates a Supplier having the product and then "drop ships" the product to the Customer though use of a Carrier. Drop shipping is an arrangement whereby the Supplier ships merchandise directly to the Customer. This technique helps the Seller avoid inventory and related administrative costs.

In today's conventional order entry/purchasing environment, where sellers distribute orders to many suppliers, the suppliers will typically have unique order interfaces or data interfaces which complicates the ability to exchange orders and order status between the suppliers and the sellers. As a means of receiving orders, confirming orders and acknowledging shipment of orders some suppliers support EDI, others use XML, telephones, and/or fax. This difficulty in receiving and providing timely and efficient shipment status has been a significant problem for both sellers and suppliers in this situation. Readily available shipment status is essential to good customer service; it minimizes the cost to obtain shipment status, improves customer service, and gives the buyer positive confirmation that their order is on its way.

For purposes of example, a current exemplary order entry process for an Internet based company known as "SellerCo.com" is highlighted in FIG. 1 of the above-reference VOV application. In this example, SellerCo.com meets the demands for difficult to find Maintenance Repair and Operating (MRO) products. Referring to FIG. 1, the process ensues at step (1), whereby the buyer/customer places an order on SellerCo.com's Internet web site. At step (2) SellerCo.com' customer service representative (CSR) locates a supplier, typically via the Internet, a supplier list or any other research means. Once the supplier is located, at step (3) the SellerCo.com provides the customer with a price estimate. This estimate can be conveyed by email, mail, fax, telephone or any other suitable communication means. In due course the customer will likely approve the price estimate and convey such back to the seller via any suitable communications medium. At step (4), the seller's CSR enters the confirmed order into the seller's ship acquisition plan (SAP) system. The supplier then communicates the order to the supplier, typically by fax, email, phone or other suitable communication means. At step (5), the supplier enters the order in their particular order fulfillment system. Typically, this process takes on average three business days to complete.

Once the supplier enters the order in to their particular order fulfillment system then, at step (6), the supplier ships the order using one of numerous possible carrier interface stations, such as UPS, FedEx, Airborne, etc. At step (7), the product is shipped and the carrier/shipping company bills the supplier for the shipping charges. This billing process typically occurs in a time frame of one to two weeks. Once the shipment commences the supplier, at step (8) invoices the seller for the cost of the product and the shipping charges. The seller, who acknowledges shipment via receipt of the supplier's invoice, bills the customer/buyer for the products and, at step (9), the buyer receives the invoice for the product and pays the seller. At step (10), either prior to or subsequent to the seller receiving payment from the customer/buyer, the seller provides payment to the supplier for the product and the shipping charges. Typically, this process takes on average fifteen business days to complete.

Under the above-described process certain business problems have been noted, which are discussed as follows. Assume that the seller places the order with the supplier and also assume that the seller does not receive shipment confirmation or status. When the customer calls the seller to determine the status of the order, the seller cannot immediately provide such information, and thus has to call or otherwise contact the supplier to get the tracking number and/or order status, which may or may not be immediately available from the supplier. Once the seller has been provided with the order status and/or shipment tracking number, the seller calls or emails the order status to the customer. Such interaction necessarily causes delay and cost to both the seller and the supplier. As a result of the seller being unable to provide immediate feedback to the customer, the customer is dissatisfied. Additionally, the manual billing aspect of the present system provides unnecessary delays in payment that further hinders the cost efficiency of the supplier and the seller.

Therefore it may be seen that the need to provide good order and shipment status is well recognized. Additionally, a need exists to provide for an order entry and order visibility system that allows for efficient billing to occur between supplier/seller and seller/customer. Such a system should also be able to provide the supplier with a streamlined shipping process that includes automated shipping label processing

SUMMARY OF THE INVENTION

The present invention discloses systems and methods for facilitating order entry, fulfillment, shipment and payment in a networked environment. In a preferred embodiment, the present invention describes a system for communicating order entries from a seller to a supplier, while providing order status information to the buyer. Also, according to a preferred embodiment of the present invention, a system and method for electronic invoice presentment, dispute resolution and payment in a networked environment is described.

In accordance with an embodiment of the present invention, a method of product order receipt and processing in a communications network is described that includes the steps of receiving from a buyer, via a communications device having communications network access, a product order from an order entry and visibility system that is implemented on the communications network; fulfilling at least a portion of the product order; shipping the product order; tracking a shipping status of the product order via the order entry and visibility system; and invoicing the buyer via the order entry and visibility system upon delivery of the shipment.

In accordance with another embodiment of the present invention, a method of product order receipt and processing in a communications network is described that includes the steps of receiving from a buyer, via a communications device having communications network access, a product order from an order entry and visibility system that is implemented on the communications network; fulfilling at least a portion of the product order; shipping the product order; tracking a shipping status of the product order via the order entry and visibility system; invoicing the buyer via the order entry and visibility system upon delivery of the shipment; providing the buyer with an opportunity to dispute the invoice; and resolving disputes related to the invoice via the order entry and visibility system.

In accordance with another embodiment of the present invention, a method of product order receipt and processing in a communications network is described that includes the steps of receiving from a buyer, via a communications device having communications network access, a product order from an order entry and visibility system that is implemented on the communications network; fulfilling at least a portion of the product order; shipping the product order; tracking a shipping status of the product order via the order entry and visibility system; invoicing the buyer via the order entry and visibility system upon delivery of the shipment; and triggering automatic payment to a vendor upon buyer approval of the invoice.

In accordance with another embodiment of the present invention, a method of product order receipt and processing in a communications network is described that includes the steps of receiving from a buyer, via a communications device having communications network access, a product order from an order entry and visibility system that is implemented on the communications network; fulfilling at least a portion of the product order; generating shipping labels for the product order via the order entry and visibility system; shipping the product order; tracking a shipping status of the product order via the order entry and visibility system; and invoicing the buyer via the order entry and visibility system upon delivery of the shipment.

In accordance with another embodiment of the present invention, a method for product order entry, product order visibility and product order processing in a communications network is described that includes the steps of: submitting, via a first communications device having communications network access, a product order to an order entry and visibility system that is implemented on the communications network; communicating the product order to a supplier via the communications network; receiving via a second communications device having communications network access, the product order from the order entry and visibility system; fulfilling at least a portion of the product order; providing product order fulfillment information to the order entry and visibility system; and shipping the product order; tracking a shipping status of the product order via the order entry and visibility system; and generating an invoice via the order entry and visibility system upon delivery of the shipment.

In accordance with another embodiment of the present invention, a method for product order entry, product order visibility and product order processing in a communications network is described that includes the steps of: submitting, via a first communications device having communications network access, a product order to an order entry and visibility system that is implemented on the communications network; communicating the product order to a supplier via the communications network; receiving via a second communications device having communications network access, the product order from the order entry and visibility system; fulfilling at least a portion of the product order; providing product order fulfillment information to the order entry and visibility system; and shipping the product order; tracking a shipping status of the product order via the order entry and visibility system; generating an invoice via the order entry and visibility system upon delivery of the shipment; and communicating product order status information, via the communications network, to the entity that submitted the product order.

In accordance with another embodiment of the present invention, a method for product order entry, product order visibility and product order processing in a communications network is described that includes the steps of: submitting, via a first communications device having communications network access, a product order to an order entry and visibility system that is implemented on the communications network; communicating the product order to a supplier via the communications network; receiving via a second communications device having communications network access, the product order from the order entry and visibility system; fulfilling at least a portion of the product order; providing product order fulfillment information to the order entry and visibility system; and shipping the product order; tracking a shipping status of the product order via the order entry and visibility system; generating an invoice via the order entry and visibility system upon delivery of the shipment; providing the invoice to an entity that submitted said product order. providing the entity with an opportunity to dispute the invoice; and resolving disputes related to the invoice via the order entry and visibility system.

In accordance with another embodiment of the present invention, an order entry and visibility system for communicating product orders and order information in a communications network, is described that includes a first communications device having communications network access, the first communications device configured to receive a product order and transmit the product order via the communication network; a second communications device having communications network access, the second communications device configured to receive the product order and generate a shipping label for the product order, the second communications device further configured to generate an invoice associated with the product order; and a communications network database configured to store information associated with the product order, and to provide a user of the first communications device and a user of the second communications device with access to the product order information.

In accordance with another embodiment of the present invention, an order entry and visibility system for communicating product orders and order information in a communications network, is described that includes a first communications device having communications network access, the first communications device configured to receive a product order and transmit the product order via the communication network; a second communications device having communications network access, the second communications device configured to receive the product order and generate a shipping label for the product order, the second communications device further configured to generate an invoice associated with the product order; the second communications device further configured to transmit a status of the product order to the first communications device upon generation of the shipping label; and a communications network database configured to store information associated with the product order, and to provide a user of the first communications device and a user of the second communications device with access to the product order information.

In accordance with another embodiment of the present invention, an order entry and visibility system for communicating product orders and order information in a communications network, is described that includes a first communications device having communications network access, the first communications device configured to receive a product order and transmit the product order via the communication network; a second communications device having communications network access, the second communications device configured to receive the product order and generate a shipping label for the product order, the second communications device further configured to generate an invoice associated with the product order; and a communications network database configured to store information associated with the product order, and to provide a user of the first communications device and a user of the second communications device with access to the product order information; and wherein further the first communications device is configured to receive said invoice and to respond with at least one of an approval of or objection to said invoice.

In accordance with another embodiment of the present invention, an order entry and visibility system for communicating product orders and order information in a communications network, is described that includes a first communications device having communications network access, the first communications device configured to receive a product order and transmit the product order via the communication network; a second communications device having communications network access, the second communications device configured to receive the product order and generate a shipping label for the product order, the second communications device further configured to generate an invoice associated with the product order; and a communications network database configured to store information associated with the product order, and to provide a user of the first communications device and a user of the second communications device with access to the product order information; and wherein further the second communications device is further configured to generate a purchase order acknowledgment and to transmit the acknowledgment to the first communications device.

BRIEF DESCRIPTION OF THE DRAWINGS

FIGS. 4-38 are typically network application pages encountered during an exemplary order entry and order visibility session including the entry of an order by a first user, typically a purchaser or a seller, followed by the fulfillment and/or shipping of that order by a second user, typically the supplier.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

General Outline

The present invention, as set forth herein, is a network communicated order entry, order visibility and shipping status mechanism. The methods, apparatuses and systems provided for by the present invention allow a first user, typically a seller of products, to input an order entry and communicate the order, via a network, to a second user, typically a supplier of goods. The supplier, who will have generally immediate order visibility capability, can fulfill the order in whole or in part, electronically print the requisite shipping labels and provide the seller with network communicated feedback that shipment of the order has commenced and, in most instances, provide the seller with a means for tracking the status of the shipment. Since the present invention allows for the users, both sellers and suppliers, to access the system concurrently it provides for the sellers to have ready access (i.e. visibility) to information related to the status of an order they have placed with a supplier. In the same regard, the supplier has immediate visibility to orders that the seller places with them and can efficiently fill and ship the orders without the need of transferring information from the order receipt/confirmation system to a shipping system.

The present invention provides the seller of the product with immediate and up-to-date access to shipment status, thereby allowing the seller to accurately and efficiently convey this information to their customers. Additionally, by providing immediate information related to when an order is shipped, the supplier benefits from being able to bill their customers in a more efficient and timely fashion. The supplier of the product benefits from using the order entry and visibility system of the present invention in that they receive order entry information in an electronic form virtually moments after the order has been placed. In addition, the supplier may be provided with a completed shipping label upon fulfillment of the order, thereby, negating the need to re-enter the shipping related information in a separate shipping label system.

Figure 1:
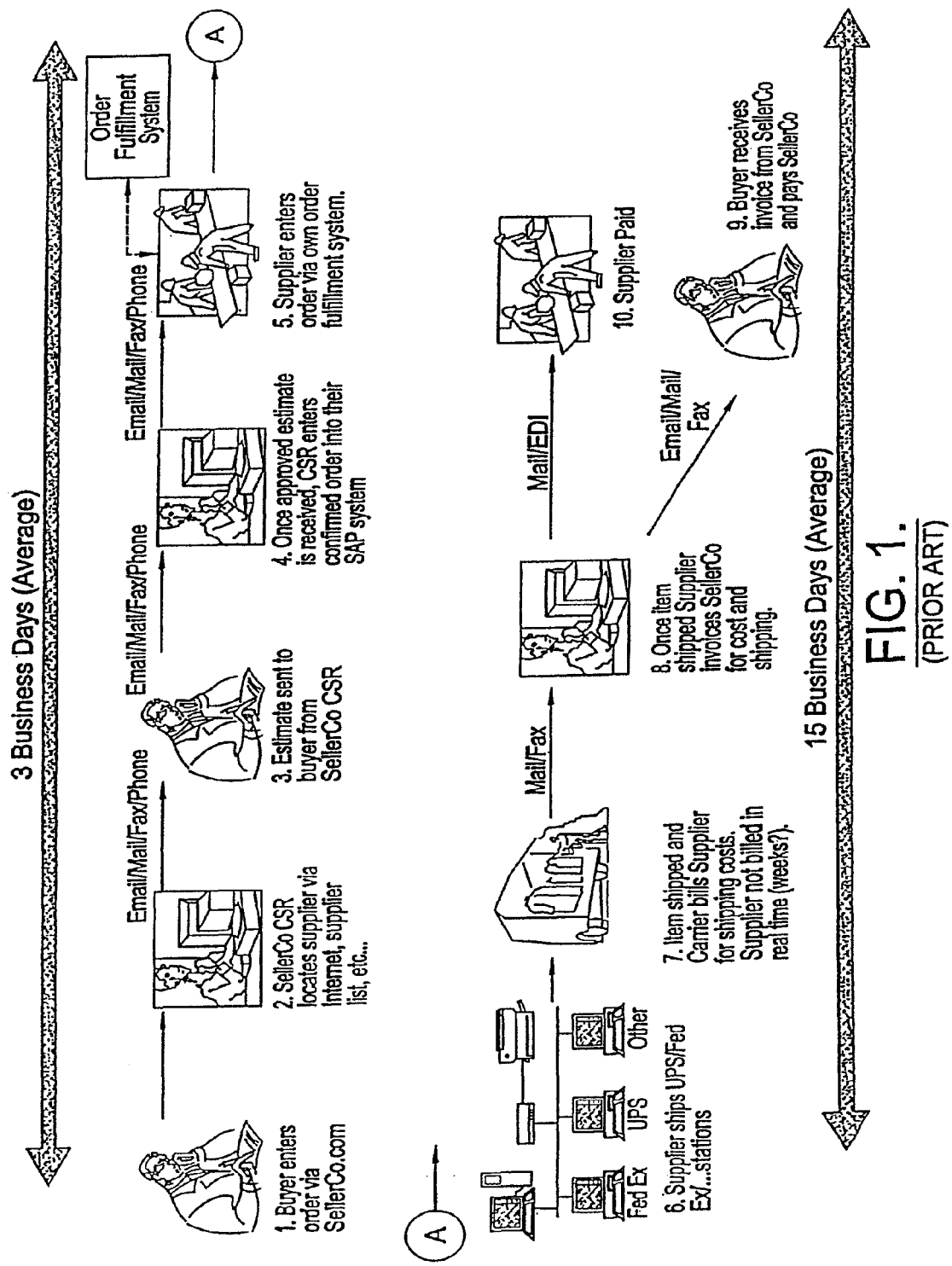
FIG. 1 is a flow diagram of a current order entry and billing system, in accordance with the prior art. This figure discloses in the form of sequential Steps 1-10, beginning with the Buyer entering an order through an exemplary Seller named "SellerCo.com" and ends with the Buyer receiving an invoice and the Supplier being paid.
Figure 2:
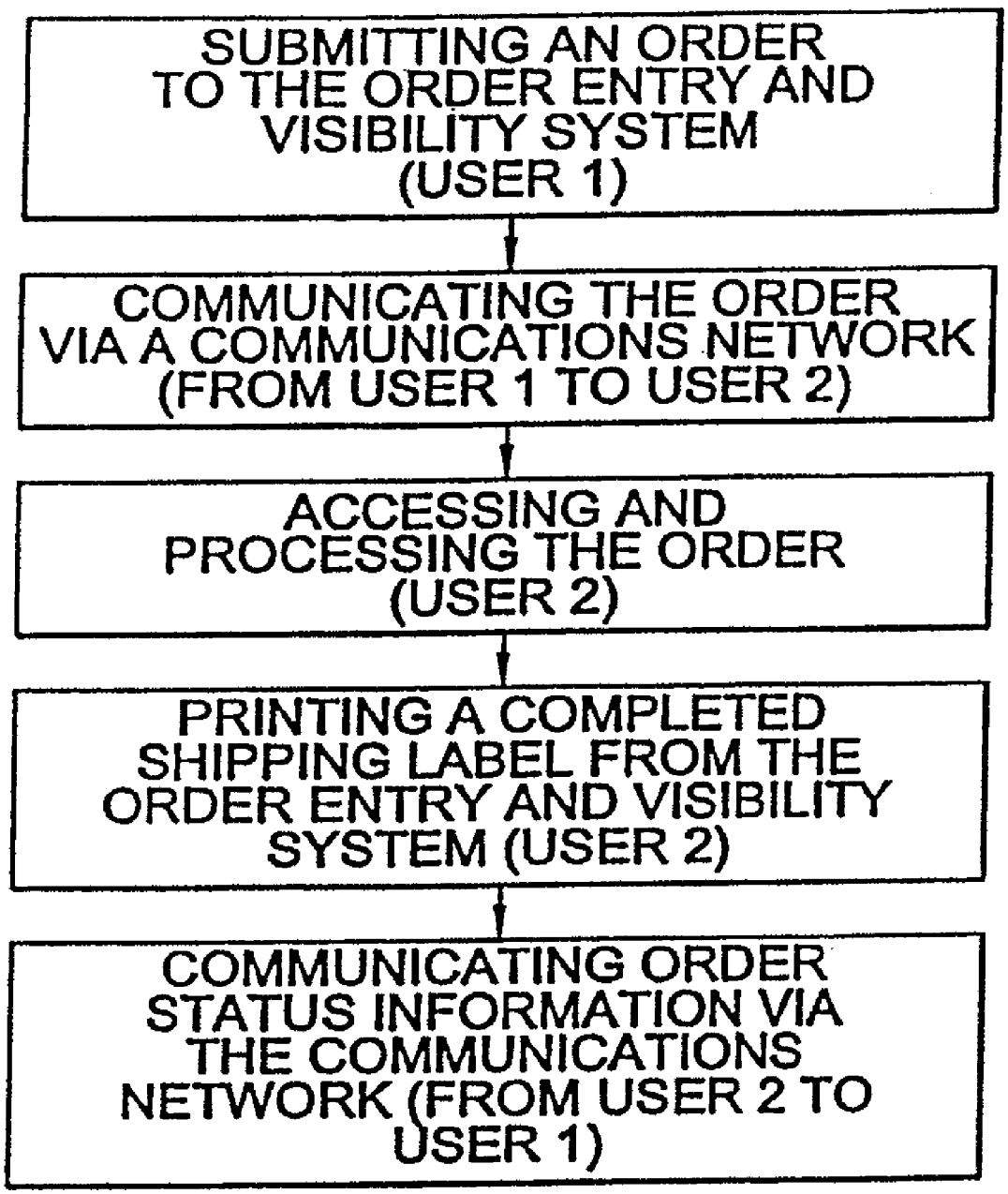
FIG. 2 is a flow diagram of a method for order entry, order visibility and shipping label generation, in accordance with an embodiment of the present invention.

In accordance with an embodiment of the present invention, FIG. 2 illustrates a flow diagram of a method for providing order entry and order visibility. At step 100 a first user, submits an order to the order entry and visibility system of the present invention. Typically, the first user will be a seller representative that accesses the system via a network interface, although the first user may also include any other purchaser authorized to place an order via the system. The first user accomplishes order entry by filling in related order entry fields within the system; examples of such order entry fields include supplier name, ship to address, line items, quantity and any other order related information. This order entry function can be accomplished either manually via key entry or automated via an ancillary order entry interface.

At step 200, the order entry is communicated via the communications network to other users of the order entry and visibility system. The Internet is the typical communications network, although other communication networks, such as more private intranets, may also be used as the communications network. Once the first user (i.e., the seller) communicates the order entry to the network the system allows for real-time visibility of the order by all users who have access the order. For example, if the order is placed with a specific supplier then that supplier and that supplier only, will have real-time access to the order information. Additionally, it is also possible to communicate the order information to other users of the order entry and visibility system, such as the customer for whom the order is being placed. In one embodiment of the invention, network communication is accomplished by communicating (i.e., storing) the order entry information to a network related database. The supplier of any given order will be notified, typically via email or other communications, that an order has been placed.

At step 300, a second user, typically a supplier representative accesses the system (i.e., the database) via a network interface. Access by the second user provides for immediate visibility of open orders placed by the first user that are intended to be fulfilled by the second user. The second user processes the order by readying for shipment either a portion of the order or the order in its entirety. Additionally, the second user may process the order as being pending if the shipment of the product will occur in the future, typically due to product unavailability, or the details of the shipping related information are not yet known.

If the second user elects to implement the shipment processing capabilities of the order entry and visibility system, then at step 400, the second user prints a completed shipping label(s) to be affixed to the shipping containers. The system provides the capability to print, ready-to-go, shipping labels for any of the shipping entities supported by the system (i.e., UPS, Airborne, Roadway, etc.). Alternatively, the second user may choose to implement internal shipping processes, thereby, foregoing the automated shipping label process of the present invention.

Once the shipment process is complete, the order status is updated and, at step 500, the order status is communicated via the communication network to the system users. In this regard, the system users have immediate access to the system database and can thereby verify the shipping status for a particular order. Additionally, the shipment of an order may trigger the system to communicate to the first user via email, XML, fax or the like, shipment related information, such as the shipping carrier's tracking number, and/or billing related information related to the cost of the products and/or the shipping charges. The order status information is typically communicated to the entity that placed the order, i.e., the seller, although, it is also possible to communicate the order status to other system users, such as the seller's customers or the like.

Order Entry and Visibility System Implementation

Figure 3:
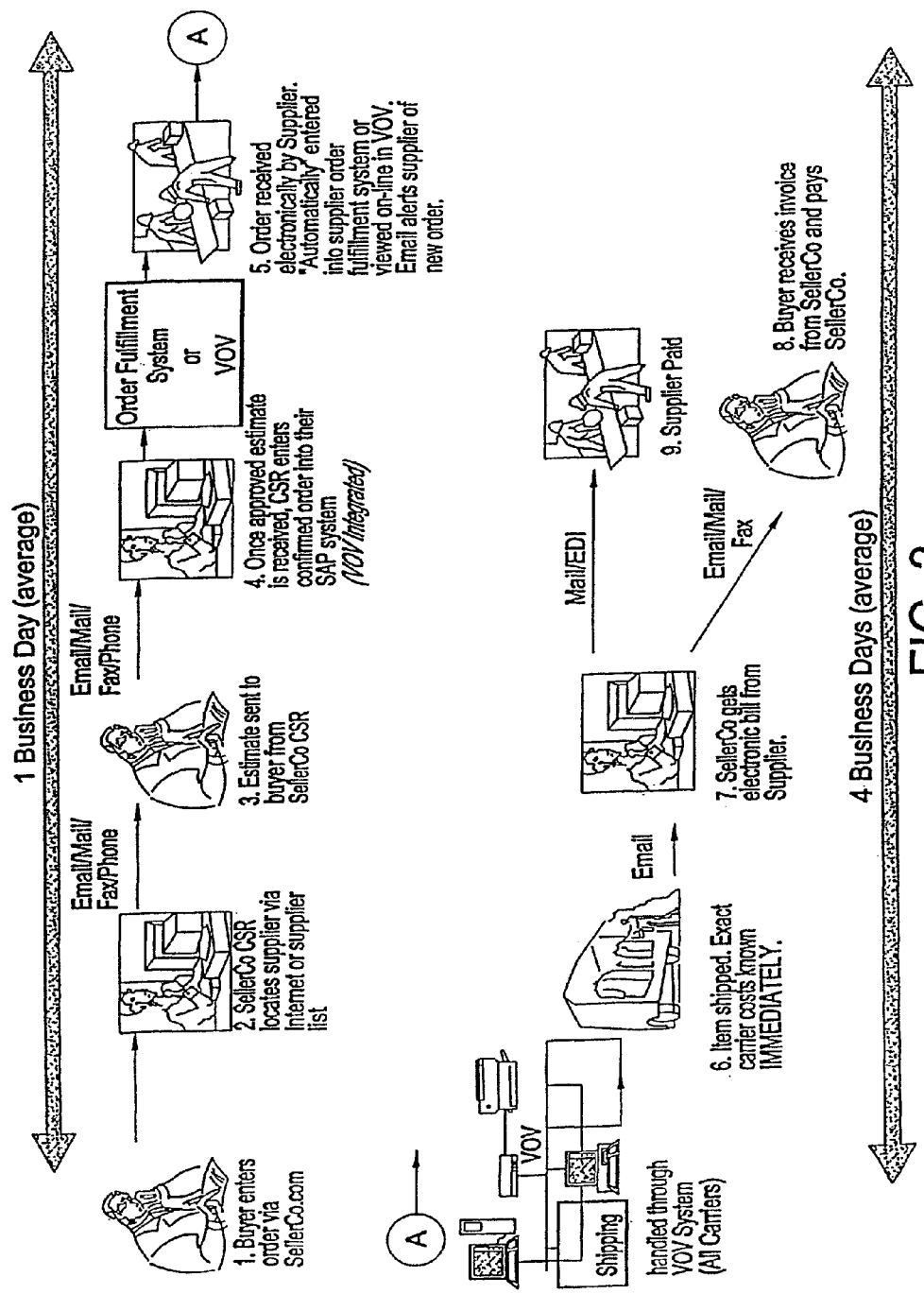
FIG. 3 is a flow diagram of an order entry and billing system that implements the order entry and visibility system, in accordance with the present invention. This figure discloses in the form of sequential Steps 1-9, beginning with the Buyer entering an order through an exemplary Seller named "SellerCo.com " and ending with the Buyer receiving an invoice and the Supplier being paid.

Referring to FIG. 3 shown is a flow diagram that illustrates the implementation of the order entry and visibility system, in accordance with an embodiment of the present invention. It should be noted that the implementation shown in FIG. 3 is not limiting and other implementations of the order entry and visibility system are feasible and within the bounds of the present invention. For the invention to be implemented in a communications network a shared, preferably secure, network site is established, typically a website located on the Internet, although other communication networks may be used, such as intranets and the like. Establishing a website for the present invention is generally known by those of ordinary skill in the computer art field and will not be detailed in this discussion.

Prior to implementing the order entry and visibility system of the present invention the following preliminary steps are discussed to gain a full appreciation of the purchasing process. At step (1) the customer/buyer provides the seller with an order for a specified product. The order may be placed via the seller's e-commerce website, via telephone, via mail or any other means. At step (2), the seller's CSR receives the order and locates a supplier via the Internet, a supplier list or any other supplier research technique. Once a supplier is located, at step (3), the seller sends the customer/buyer a price estimate, typically the estimate is sent via email, fax or other suitable communication means. The customer/buyer will typically approve the price quote via standard communication means, such as email, fax or the like. Once the approved estimate is received from the buyer/customer, at step (4), the seller enters the confirmed order into their particular order entry system.

In accordance with one embodiment of the invention, the order entry and visibility system is capable of interfacing with the seller's order entry system such that the seller's order entry system automatically transfers the necessary order information to the order entry and visibility system of the present invention (shown in step (4) as OV (order visibility) integration). In an alternate embodiment of the invention, the seller may be required to manually or otherwise input the order data into the order entry and visibility system of the present invention. At step (5), once the order has been entered into the order entry and visibility system it is electronically communicated via the network to the supplier. The supplier will have generally real-time access to the order once the seller places the order in the system. An automated email or other form of communication is typically sent from the seller to the supplier alerting them that an order has been placed and is available within the order entry and visibility system.

At this stage, once the supplier receives the order via the order entry and visibility system of the present invention the supplier may choose to integrate the order into their particular order fulfillment system or to utilize the order visibility system as their order fulfillment system. In the instance in which the supplier transfers the data from the order entry and visibility system to their particular order fulfillment system the transfer may be automated or manual.

The shipping of the product will typically be processed through the order entry and visibility system. The seller or the supplier will have the capability to dictate the carrier to be used for the shipment. The invention will provide for the capability to have fully complete shipping labels, corresponding to the shipping labels of the chosen carrier, printed out. The supplier may choose to ship the order in total or the supplier may choose to ship the order in part, such that the order visibility system statuses the shipment as shipped or partially shipped, accordingly. Alternately, the supplier may choose to forego the shipping aspect of the present invention and process shipping of the order through separate individual carrier processing stations.

If the order entry and visibility system is used to process shipping then once the item has been shipped, at step (6), the exact carrier costs are immediately known. This eliminates the need for the carrier to bill the supplier for the shipment charges and, as such, the supplier is able to immediately, via email or other suitable communication means, bill the seller for the cost of the product and the shipping charge. At step (7), the seller receives the invoice from the supplier and can then immediately bill the buyer/customer, via email or other suitable communication means. At step (8), the buyer receives the invoice and pays the bill accordingly. Either prior to or subsequent to the seller receiving payment from the buyer, at step (9), the seller provides payment to the supplier, typically either electronically or via the mail. By providing for efficient means of billing the seller and the customer the overall billing cycle time is substantially reduced and cost efficiencies are realized by both the supplier and the seller.

Sequential Example of the Order Entry and Visibility System

As may be understood, the present invention will typically be implemented on the Internet and the users will be required to have access to the Internet through a compatible Internet browser, such as Internet Explorer manufactured Microsoft Corporation of Seattle, Washington or Netscape manufactured by Netscape Communications Corporation of Mountain View, Calif. However, it should readily be understood that the present invention contemplates the use of other standard Internet browsers as well as proprietary browsers if so desired. The typical browser will be configured to accept graphics, allow JavaScript language programming (or another suitable cross-platform, object-based scripting languages) and enable secure socket layer encryption technology.

Order Entry and Visibility System Interfaces

In accordance with the present invention, the order entry and visibility system will typically have three interfaces. These interfaces include, but are not limited to, a system administrator; a first user, typically a seller's customer service representative (CSR); and a second user, typically a supplier's representative. In order to fully appreciate the functionality of the overall system, the following discussion briefly explains the function and interaction of these interfaces.

The system administrator provides the authorized user with the ability to assign user accounts for the order entry and visibility system and configure user rights as either a seller's CSR or a supplier's representative.

The first user or seller's CSR interface provides the capacity to enter orders and assign them to specific suppliers. Additionally, the seller's CSR is able to view the orders, edit the orders, and track the status of the order. Order processing is tracked by the seller's CSR by visibility to the second users processing of the order (i.e. Is the order still listed on the system as open?, pending?, partially shipped?, or shipped?). Shipping tracking is typically accomplished by using the tracking number that was assigned by the second user as a result of performing the shipping operation.

The second user or supplier's representative interface provides for the ability to view orders specifically assigned to the supplier and to process the orders assigned accordingly. Processing the order typically entails fulfilling the order, either in total or in part and readying the order for shipment. The supplier's representative interface inputs information into the system regarding the status of orders being processed. In one embodiment of the invention, the supplier's representative interface will implement the shipping aspect of the invention to provide for completed shipping labels to finalize the shipping process.

Alternatively if the supplier does not need the shipping aspect of the present invention to print the shipping labels, the supplier representative may, manually or otherwise, enter the shipping related information into the order entry and visibility system of the present invention. This shipping label override feature allows for the suppliers to continue using their own sophisticated shipping process if the suppliers so choose. Also, the supplier' representative interface may input shipping related information if the desired carrier is defined as a Less Than Truckload (LTL) carrier.

First Order Visibility System Interface—The Seller

Figure 4:
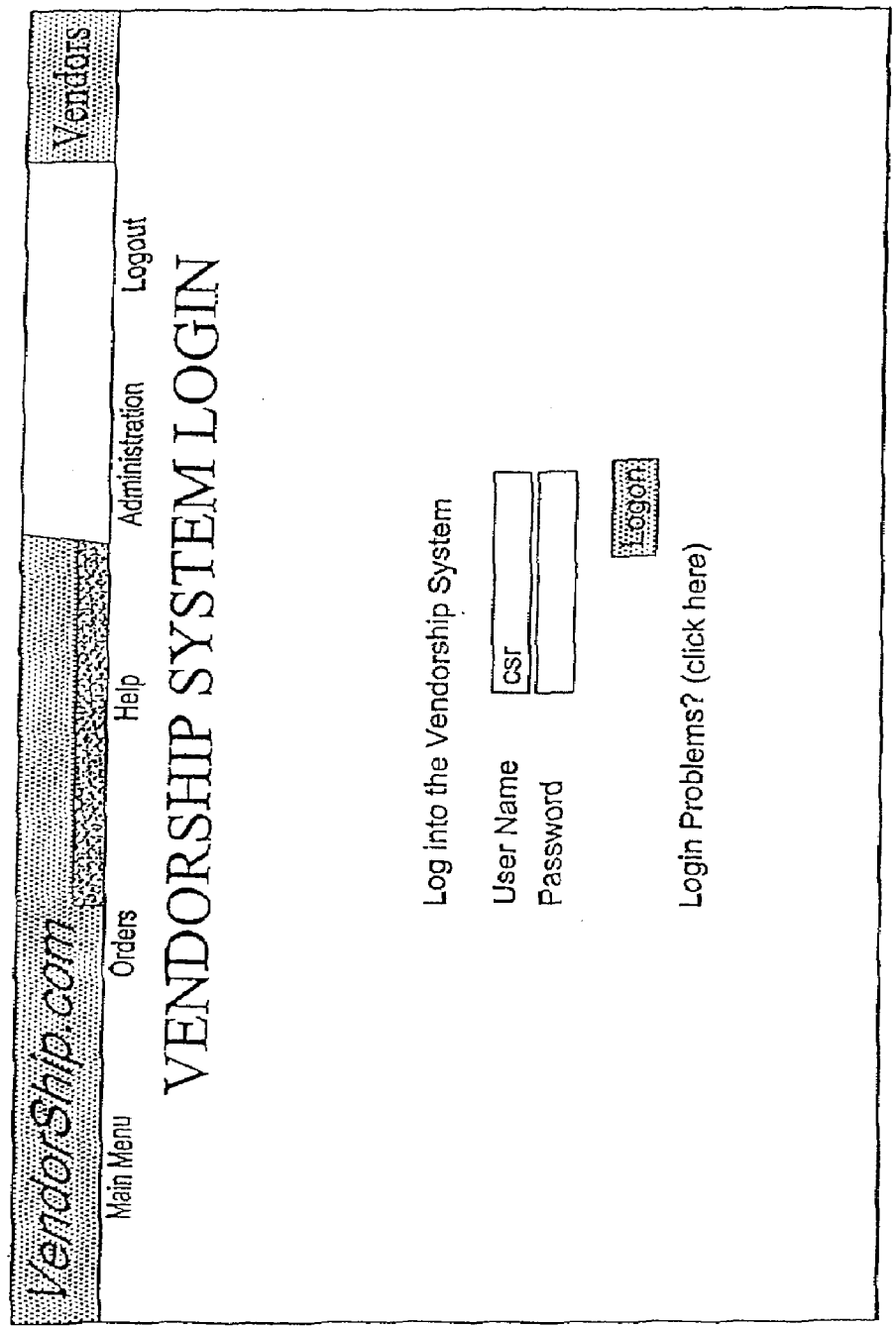

For purposes of initial discussion, a typical seller's Customer Service Representative (CSR) will be assumed to be the first user, i.e., the first interface, of the present invention's order visibility system. Typically, a seller's CSR will access the order visibility system to input customer orders into the system and send the orders to specified suppliers. Additionally, the CSR will access the order visibility system to check the status of orders. FIG. 4 is a typical order visibility system log-in page that is encountered by the CSR when accessing the specific network address associated with the order visibility system. The CSR will proceed with inputting a user name and password in the designated areas on the log-in page. For the example portrayed in the figures, the user name of the customer representative may be assumed to be "csr", and the password can be set as desired.

Figure 5:
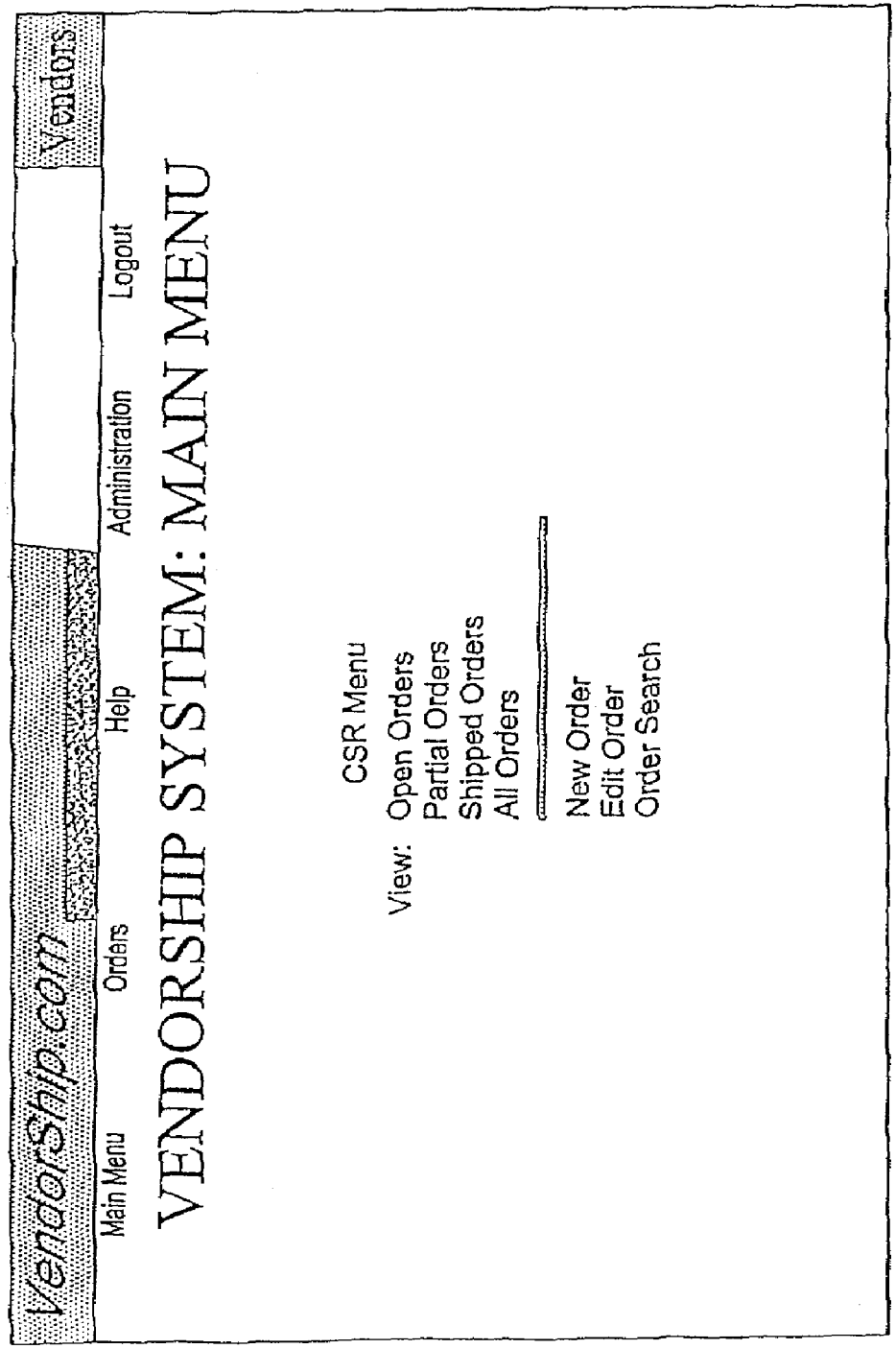

After the user/CSR has successfully logged on to the order visibility system, the user will gain access to a Main Menu page, FIG. 5. As may be seen, underneath the main menu title the following subtitles may exist, which also function as hyperlinks: Open Orders, Partial Orders, Shipped Order, and All Orders. In addition, the main menu will typically include subtitle/hyperlinks that provide for access to New Order, Edit Order and Order Search functions.

Figure 7A:
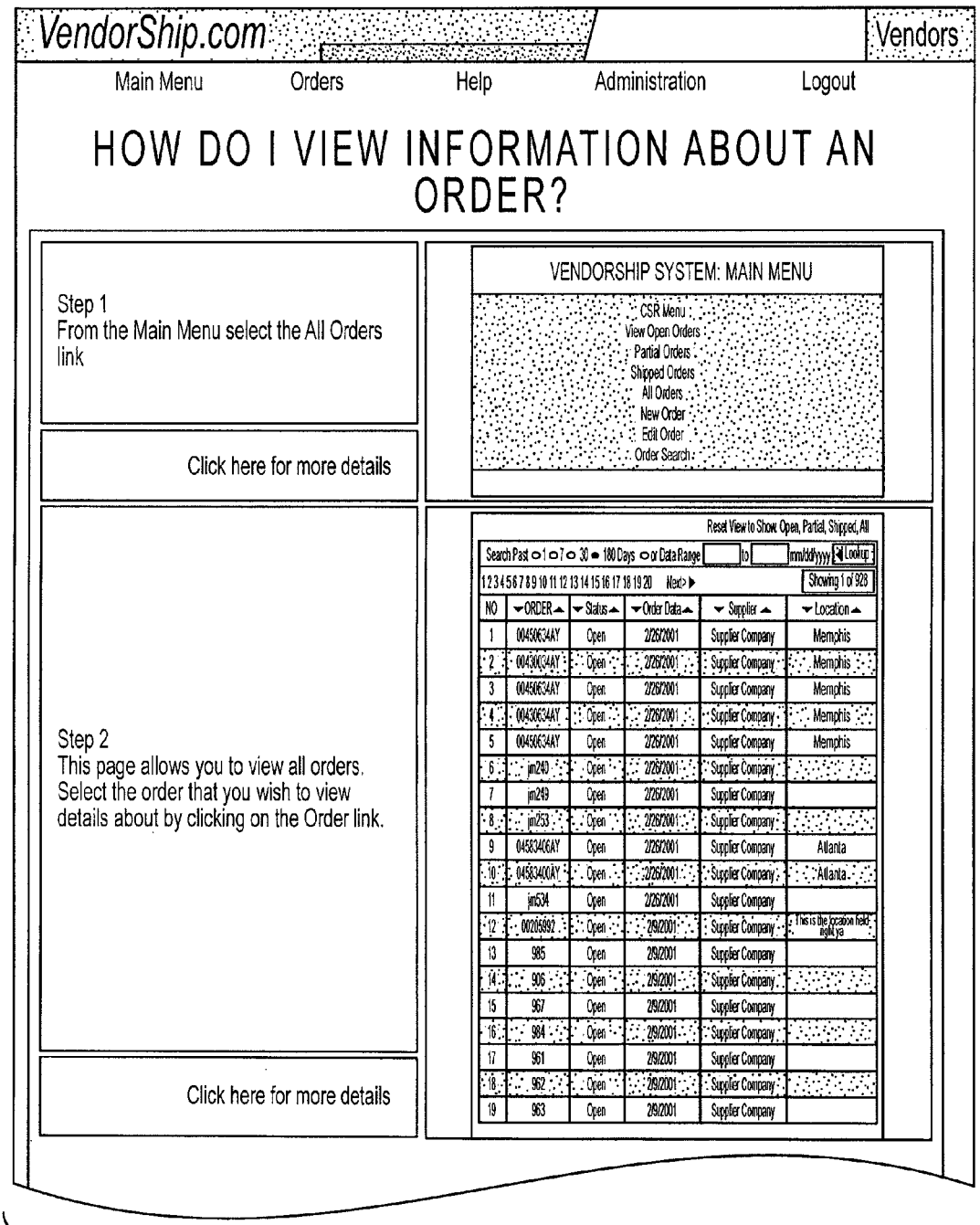

As will be seen in subsequently described web pages (i.e. figures), the Main Menu page includes a "heading" graphic with one or more embedded links. Of note, one of these links is a "Help" link, which provides for a pull-down menu of various help sections. By selecting the help section entitled "Help Main Menu" the page shown as FIG. 6 will be accessed. This page provides for a column entitled "Help Features" and a column entitled "Common Processes". The "Help Features" column includes hyperlinks to frequently asked questions, an email address, new features, a glossary of terms and a site map. The "Common Processes" column includes "How to" links for various processes that a CSR will customarily perform. For example, by selecting the sixth link entitled "How do I view information about an order?", the user will be provided access to an instructional page, shown in FIG. 7, that defines the specific steps involved in viewing information about an order. Each step in the process provides for a link entitled "Click here for more details" that provides accesses to a page comprising more detailed instruction and a full page-size figure corresponding to the downsized figure accompanying the specific step.

Referring again to FIG. 5, a CSR/user could select, or "click-on", the "New Order" link if the CSR desires to enter a new order. Likewise, the CSR could select the Edit Order link in order to edit a previously inputted order. Additionally, the CSR could select one of the links entitled Open Orders, Partial Orders, Shipped Orders or All Orders, respectively, if the user elects to view the status of open orders, partial orders, shipped orders, or all orders, respectively.

For purposes of discussion, it will be assumed that from the page shown in FIG. 5 the CSR/user selects the "All Orders" link, resulting in a page display such as shown in FIG. 8. This page display is entitled Order Listing, and it allows the CSR to search the entire order database within a specific date range or for a predefined preceding number of days. In the instance shown in FIG. 8, the default range is the preceding 180 days. The Order Listing page will typically include headings corresponding to information related to the orders, in the example shown six headings correspond to six columns of related information. The first column is labeled ID, the second column is entitled ORDER, the third is entitled STATUS, the fourth is labeled ORDER DATE, the fifth is entitled SUPPLIER and the sixth is labeled LOCATION. The ORDER field comprises the seller's order numbers and the STATUS field defines the status of particular orders as being open (i.e., order placed but not yet shipped), shipped or partially shipped. The field entitled ORDER DATE identifies the dates on which the orders were initially placed. The SUPPLIER field identifies the particular suppliers that have been identified for delivery of the different orders and the LOCATION field identifies the location of the particular supplier.

FIGS. 9-10 are similar to FIG. 8, except that they show "Open", "Partial" and "Shipped" orders, respectively. These pages can be accessed by selecting the "Open Orders", "Partial Orders" or "Shipped Order" links on, for example, FIG. 5.

As shown in FIGS. 8-10, the various columns may be sorted in ascending or descending order by use of the upwardly or downwardly oriented arrows next to the labels of the individual column headings. A sort function within the heading may provide for the ORDER, STATUS, ORDER DATE, SUPPLIER and LOCATION fields to be sorted in numerical order, alphabetical order or chronological order depending on the field entries comprising the column. For example, FIG. 10 depicts shipped orders that have been chronologically sorted by order date with the most recently placed order appearing first in the ORDER DATE column.

If the CSR/user attends on placing a new order, a suitable "New Order" link, such as displayed on the Main Menu page or the "Order" pull-down menu found on most page headings, will be selected. Once "New Order" entry has been selected the CSR/user may access a page entitled New Order, as shown in FIG. 11, which requests the user to enter the customer number associated with the customer purchasing the order to be entered. Under one aspect of the present invention, if an existing customer number is entered in this field, existing customer information will be retrieved from a customer database and used to place the new order. However, if a new, previously, unused customer number is inserted, a new customer information page will be provided. For purposes of discussion, a new customer number will be used, namely 063000. Inputting the new customer number will result in access to a page entitled Customer Information: New Customer, as depicted in FIG. 12. This page illustrates the various entry fields that may be used for new customer information.

Figure 13:
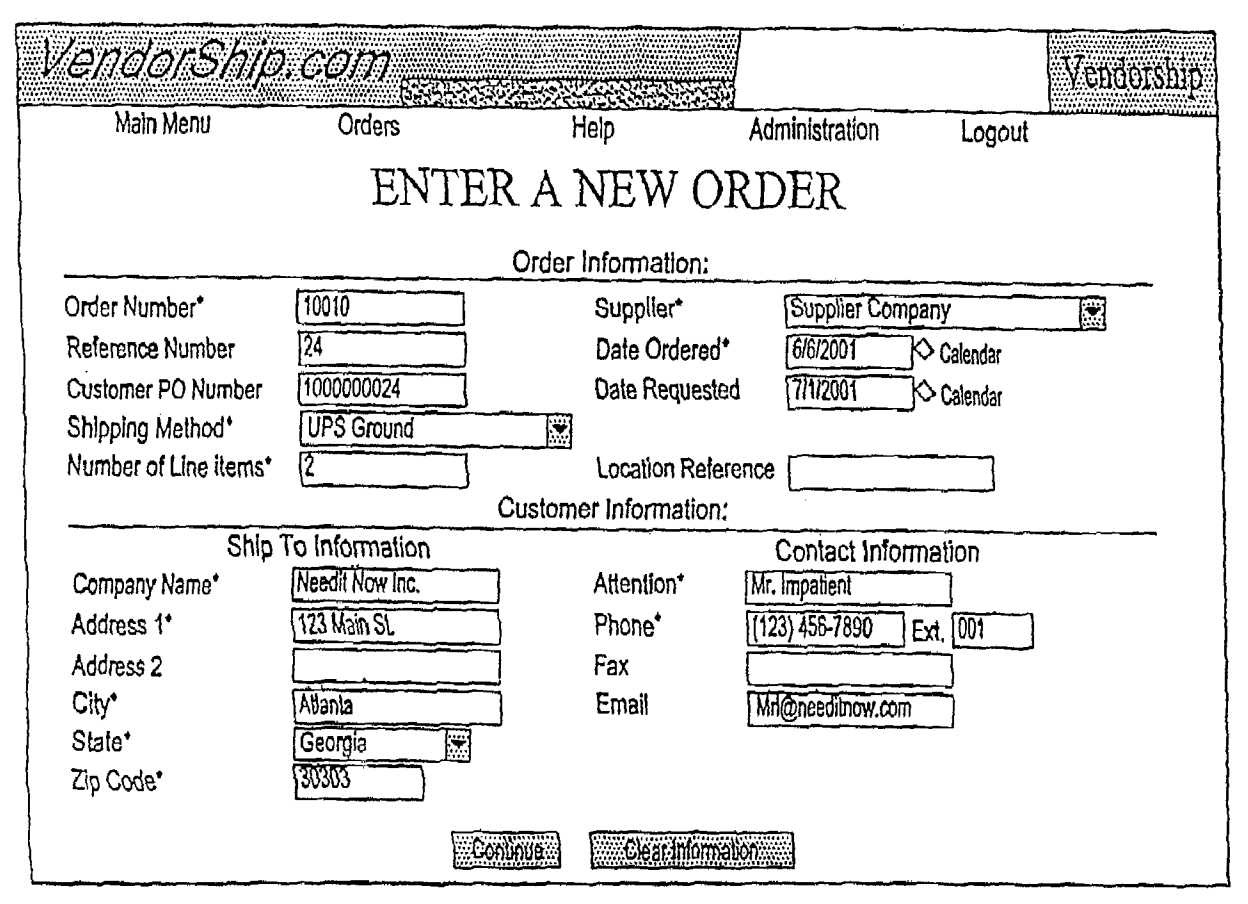

After completing the entry fields found on the New Customer information page the user/CSR will select "Submit". By selecting the "submit" option the new customer information is stored in the customer database. Additionally, selecting the "submit" option will provide the user/CSR with access to a page entitled Enter a New Order, as shown in FIG. 13. The new order entry page will typically comprise fields for order information and fields for customer information. The customer information will be carried over from customer information database in those embodiments of the invention that incorporate a customer database. In an alternative embodiment of the invention, in which the customer database does not exist, the user/CSR will be required to provide inputs to all the customer information fields displayed within the new order entry page.

The order information fields on the new order entry page may comprise, Order Number, reference Number, Customer PO Number, Shipping Method, Number of Line Items, Supplier, Date Ordered, Date Requested and Location reference. The required fields are indicated by an asterisk located adjacent to the field name. The user/CSR will manually input order information into the order information fields or an ancillary SAP system may electronically interface with the order entry system of the present invention to provide the requisite order information.

If the user/CSR is uncertain as to what information is to be provided in a given field, the user/CSR may access the pull-down "Help" menu located in the page heading. Provided for within the pull-down "Help" menu is an entry entitled "Glossary". By selecting the "Glossary" entry, the user/CSR is provided access to the Glossary page, as shown in FIG. 14. The glossary is alphabetically assembled and provides brief descriptions of all the field entries found within the order visibility system. If the user/CSR desires further assistance in completing the new order entry, provided for within the pull-down "Help" menu is an entry entitled "Help Main Menu". By selecting the "Help Main Menu" entry, the user/CSR is provided access to the Help Main Menu page, as previously discussed and as shown in FIG. 6. By selecting option 1, entitled "How do I create a New Order"; the user/CSR will access specific step-by-step instructions detailing the method for creating new orders, as shown in FIG. 16.

For purposes of this discussion and as illustrated in FIG. 13, the user/CSR enters the Order Number as "10010". The Reference Number is entered as "24". The Customer Purchase Order (PO) Number is assumed to be "1000000024". The Shipping Method is selected to be "UPS Ground". The number of line items in the order is "2". The chosen supplier is "Supplier Company". The date ordered will correspond to the present date and the date requested will be defined by the user/CSR, in this instance the first day of the subsequent month. For the purpose of this example, the Location Reference field is assumed to be undefined.

In a typical order visibility system the seller may predefine the shipping options and the supplier options. The predefined options may be displayed to the user/CSR by a pull-down menu associated with the order entry fields for shipping method and supplier. For instance, the seller may predefine UPS Ground, UPS next Day Air, and various LTL (Less Than Truckload) carriers as suitable shipping options. In accordance with an embodiment of the present invention and as will be discussed at length in subsequent detailed discussion, once the supplier receives the order, with a requested shipping method, the supplier can then process the order and automatically print a shipping label associated the chosen shipping method.

Once the user/CSR enters the required information in the order information fields and/or the customer information fields, the user/CSR can select "Continue" to continue the order entry process or the information provided in the fields may be edited by selecting the "Clear Information" option. For purposes of this discussion the user/CSR selects the "Continue" option and access is provided to a page entitled Line Items for Order 10010, as depicted in FIG. 16.

The Line Item Order page provides for line item order entry corresponding to the number of line items entered in the previous Order Entry page, in this instance, "2". The line item field includes Line Item ID, SKU/Item Number, Quantity, Description and Reference. The Line Item ID is a unique identifier for this particular order, in this instance, line item 1 is assigned "100" and line item 2 is assigned "200". The SKU/Item Number is typically the suppliers number for the particular item, in this instance, line item 1 is defined as "188" and line item 2 is defined as "189". The quantity desired is defined in this instance as "2" for line item 1 and "1" for line item 2. The description field provides for a description of the goods being purchased, for instance, line item 1 is a "widget" and line item 2 is a "widget holder". The reference field, which has been left undefined in this instance, provides the user/CSR with the ability to add reference information, as necessary.

Once the user/CSR enters the required information in the Line Item order information fields the user/CSR can select "Continue" to continue the order entry process or the information provided in the fields may be edited by selecting the "Edit Order Information" option. For purposes of this discussion the user/CSR selects the "Continue" option and access is provided to a page entitled, Order Confirmation, as depicted in FIG. 17.

Figure 18:
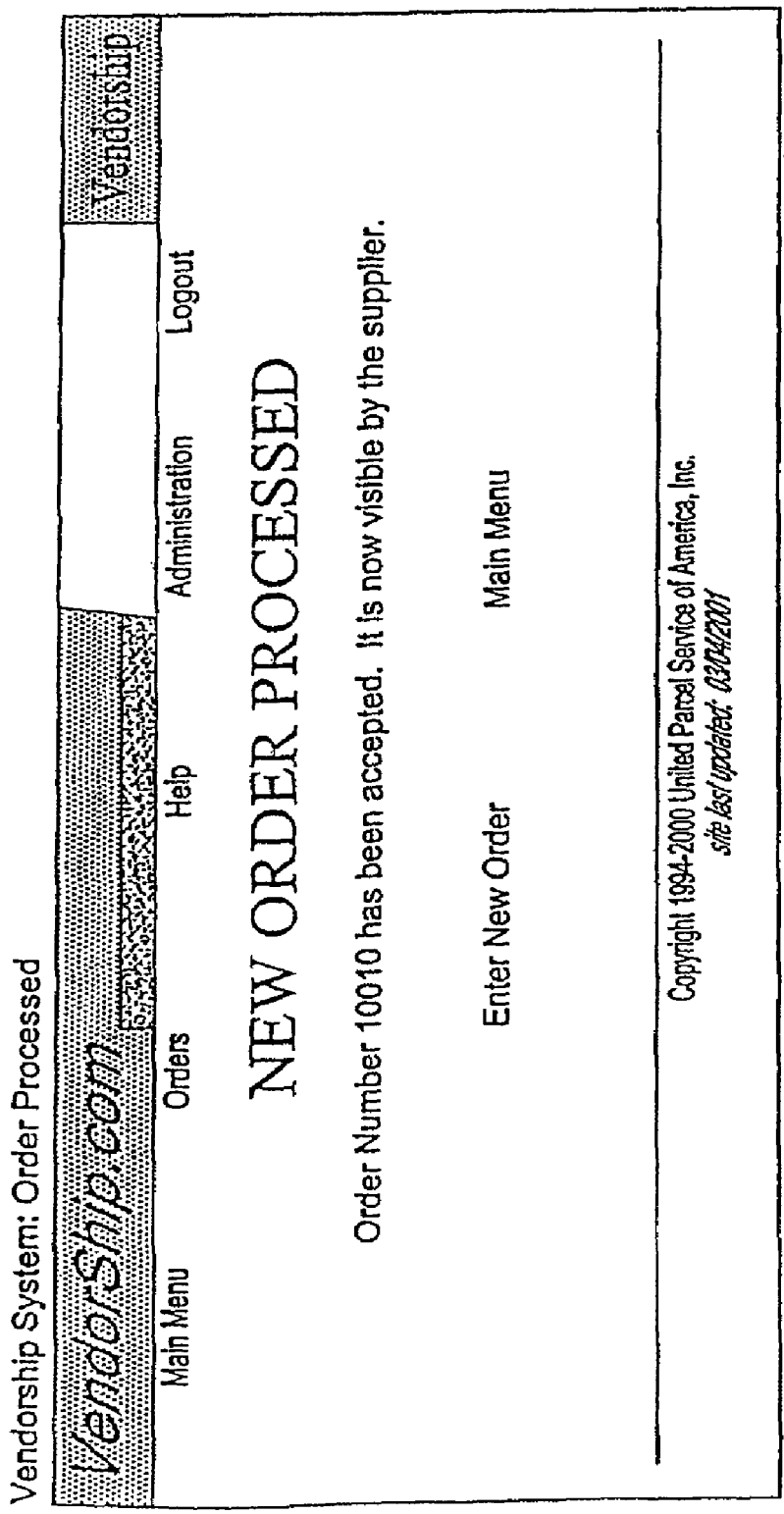

The Order Confirmation page will indicate new order details, customer information and line item information, which corresponds to the information previously entered. If the information shown is incorrect, the user/CSR may select the "Edit Order" link to edit any of the information shown in the confirmation. However, assuming the order information is correct, the "Process Order" link will be selected and the user/CSR is directed to a page entitled, New Order Processed, as shown in FIG. 18.

The New Order Processed page indicates that the new order has been accepted by the system and placed with the supplier. In this instance, it is noted that the order number 10010 has been accepted and the order is now "visible" to the chosen supplier, in this instance "Supplier Company". "Visible" in this application means that when the supplier accesses the order visibility system this particular order will now appear as being placed and requiring action on the part of the supplier. In addition, confirmation of the order being placed will also prompt the order visibility system to automatically send the supplier an order communication, typically either e-mail or a xml feed, alerting the supplier that an order has been placed. After confirmation of the order being placed, the user/CSR may select to return to the "Main Menu", "Enter a New Order" or "Logout".

For purposes of this discussion, it will be assumed that the user/CSR returns to the Main Menu and selects the "All Orders" link, resulting in the user/CSR accessing the page that comprises all of the orders currently placed, such as shown in FIG. 19. As may be seen, FIG. 19 is a view similar to that of FIG. 8 except that the new order #10010 is included at the top of the list, indicating that its status is OPEN, the order date is Jun. 6, 2001, and the supplier is Supplier Company.

Second Order Visibility System Interface—the Supplier

At this point, for purposes of discussion, it will be assumed that a representative of the supplier, Supplier Company will access the order visibility system for the purpose of receiving and filling the order that was placed by the seller. However, it should be understood that the supplier may access the system either before or after the customer service representative has "logged out." Once the order has been confirmed at the seller's end, the order will be communicated to the supplier and the supplier will have the capability to view that order momentarily thereafter (depending on the speed of the network communication). The seller and the supplier may, and very often will, be logged-on to the system simultaneously.

Figure 20:
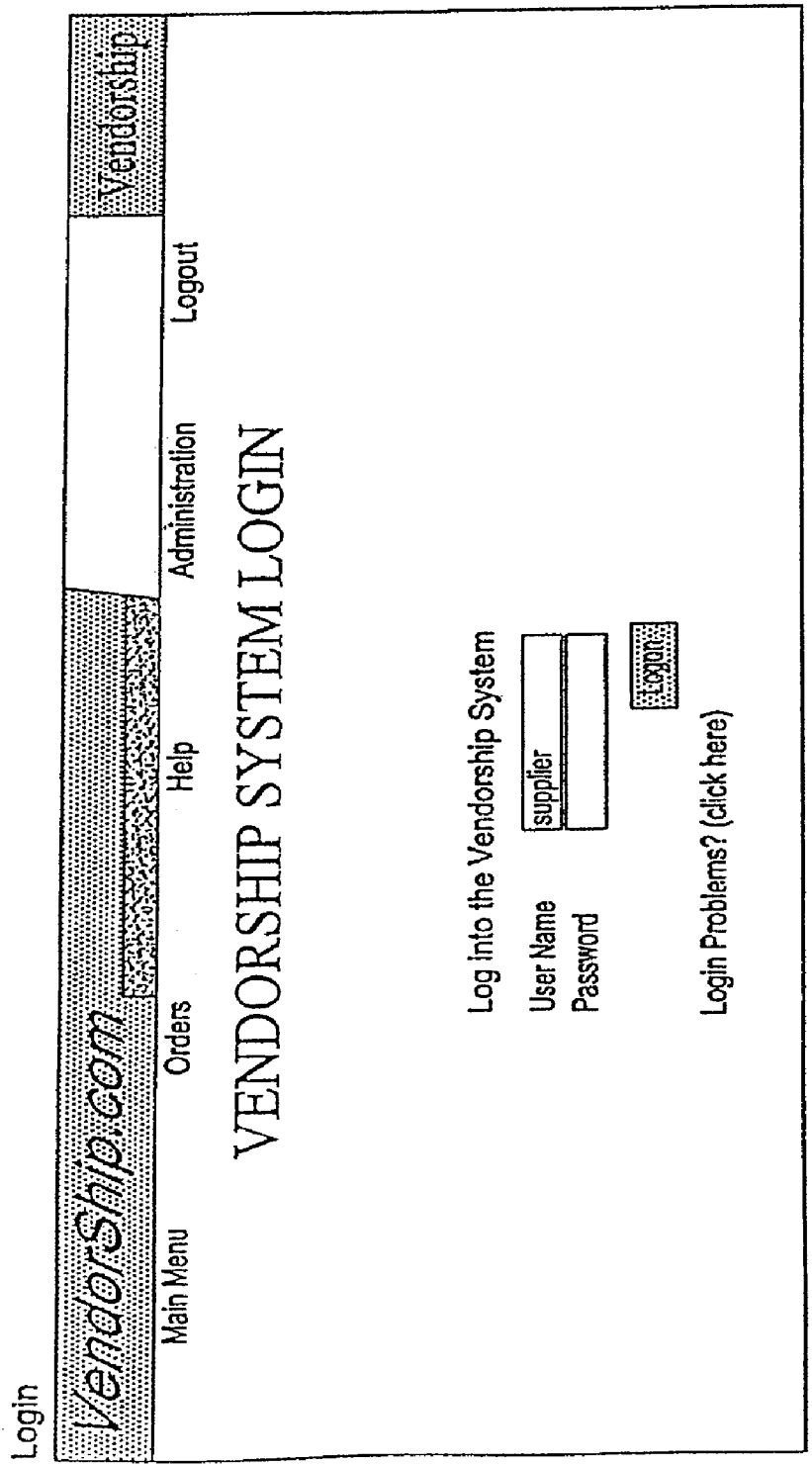

FIG. 20 is the same order visibility system log-in page as FIG. 4 that is accessed by inputting the specific network address associated with the order visibility system. However, in this instance, the page is being accessed by the supplier and the supplier's representative will proceed with inputting a user name and password in the designated areas on the log-in page. For the example portrayed in the figures, the user name of the supplier's representative may be assumed to be "supplier", and the password can be set as desired.

Figure 21:
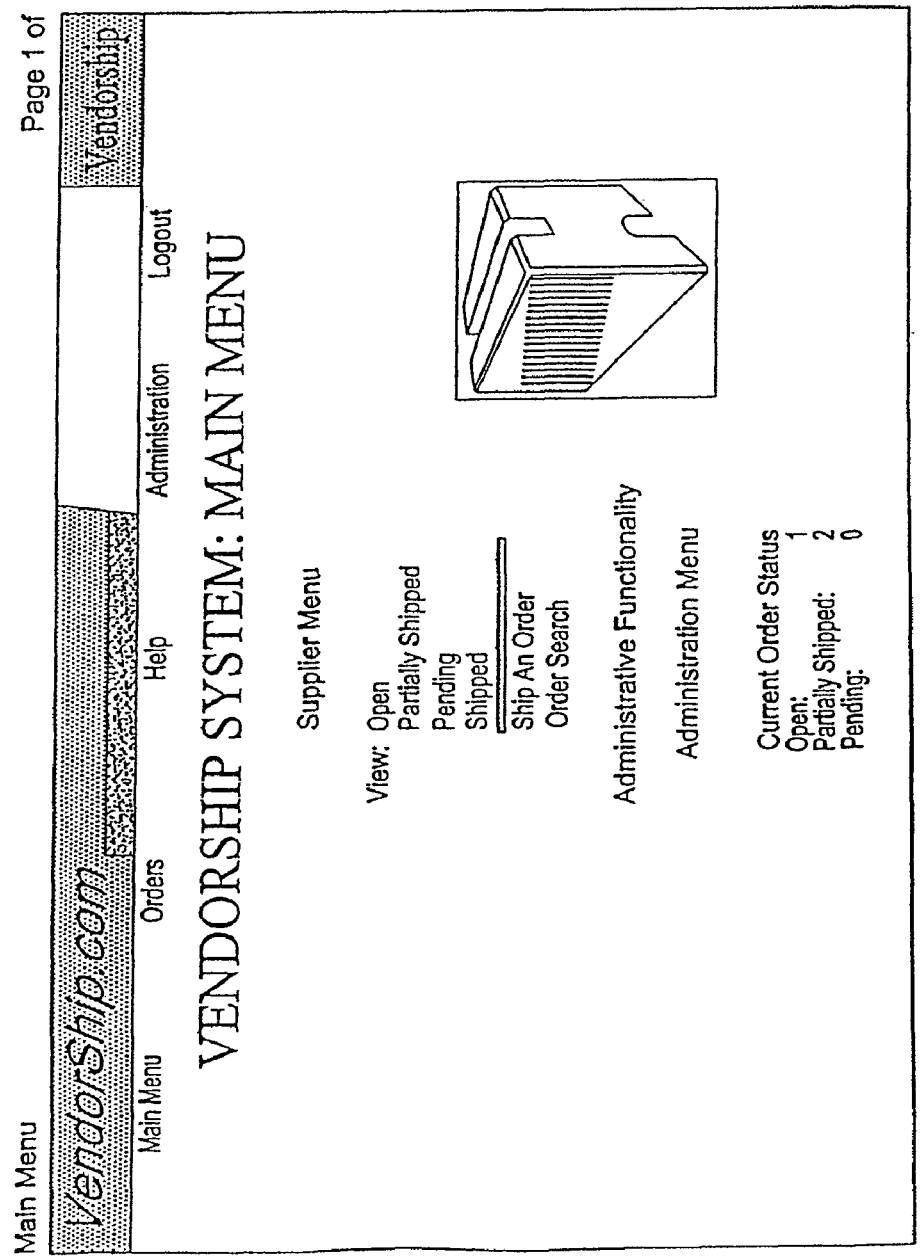

Upon entering the appropriate User Name and Password, the supplier's representative will access a page entitled, Main Menu, as shown in FIG. 21. The Main Menu for the supplier provides the current order status (1 open order, 2 partially shipped orders and 0 pending orders), as well as the following links: "Open", "Partially Shipped", "Pending Orders", "Shipped", "Ship an Order" and "Order Shipped". As may be understood, these links provide access to the supplier' particular open orders, partially shipped order, pending orders, shipped orders, as well as provides a shipping link and an order search function.

In this instance, the supplier's representative selects "Open" orders to view orders placed by the seller that have yet to be processed. As shown in FIG. 22, the supplier accesses a page entitled, Order Listing that provides information related to open orders. The page allows the supplier to search the entire open order database within a specific date range or for a predefined preceding number of days. In the instance shown in FIG. 22 the default range is the preceding 180 days. This page may include order information, such as, seller's Order Number, Order Status, Order Date, as well as the Customer purchasing the goods. It may be noted that there is no need to provide any supplier related information at this point, as it is assumed that the supplier viewing such an order listing will be the supplier assigned to these particular orders by the seller.

As may be seen, The order visibility system of the present invention provides the supplier with access to (i.e. visibility)

the supplier's "partially shipped" orders (FIG. 23), the supplier's "shipped" orders (FIG. 24) and/or the supplier's "pending orders" (FIG. 25). Partially shipped orders are defined as those orders that still have line items or portions of line items yet to ship. Pending orders are defined as those orders that have been processed and filled but have yet to ship (i.e. assigned shipping tracking numbers). Shipped orders are those orders that have shipped in total.

The supplier has various options obtaining the information necessary to ship open orders. The supplier may access the open orders page via the Main Menu page and select the order number of any open order. By selecting the open order number, the supplier will be directed to a page entitled, Ship Order XXXX, where XXXX indicates the order number. The Ship Order page is illustrated as FIG. 26. Alternatively, the supplier may select the "Ship an Order" link from the Main Menu that directs the supplier to a page entitled, Ship Order Search, as shown in FIG. 27. The ship order search page requires the supplier to input information related to an open order. Thus the supplier would be required to have knowledge of the shipment, in the form of an order number, a reference number, a customer PO number or the like. By inputting the order number, in this instance "10010", the supplier is directed to the same Ship Order XXXX referenced above and shown in FIG. 26.

As shown in FIG. 26, the Ship Order page is provided which includes the order number, customer information (i.e. to whom the order will be shipped to), as well as provisions to enter certain shipment information corresponding to the package. As may be seen, such shipment information includes fields for weight (in pounds), dimensions (typically in inches), special requirements for an oversized package and/or a delivery, the declared value (in dollars), number of packages and shipper tracking number. Additionally, the shipment information will indicate the seller's desired shipping service. In one embodiment of the invention, the supplier may be able to override the seller's desired shipping service if so desired. To allow for the shipping service to be overridden by the supplier a pull-down supplier menu may be provided that lists acceptable alternative shipping services. The Ship Order page also comprises fields for LTL information. LTL information is required if the seller has requested shipment via LTL carrier or the supplier has overridden the seller's shipment request and has chosen an LTL carrier. These fields may include tracking number, shipment description, carrier instructions, package description, LTL class, BOL (Bill of Lading) number or the like.

Prior to entering the order package information, the supplier will typically access the details of the order by selecting the "View Order Details" link on the Ship Order page. A separate network window will typically be opened that provides access to the page shown in FIG. 28, that provides order details, such as supplier name and address, order number, order status, customer/ship to name and address, customer PO number, date ordered, date requested and line item information. From this page the supplier may also view any additional seller-supplied notes related to the order by selecting the "View Order Notes" link on this page.

Once the supplier determines from the Order Detail page that inventory exists to fulfill at least a portion of the order, the supplier will proceed with fulfilling the order by pulling the requisite stock and boxing the shipment, accordingly. Package information is then provided by the supplier in the appropriate package information fields on the Ship Order page. As a minimum the package weight and the shipping service must be provided before the order can be processed as shipped. Additionally, the remaining package information fields may be completed to provide further description of the package and/or to define additional shipping requirements. The supplier can manually enter a tracking number or a tracking number can be automatically provided for when the shipping label is subsequently generated.

If the seller or the supplier has indicated that LTL shipping is to be performed then the fields listed under LTL information will typically be completed prior to selecting "Ship Order". Assuming that an LTL-type shipper is to be used it should be noted that if the supplier does not enter a "LTL Tracking Number," the order would be, according to the present invention, classified as a "Pending Order" awaiting shipment upon the assignment of the appropriate tracking number. The supplier or the shipper is then instructed to return to the Ship Order page and enter the LTL tracking number at which point the status of the order changes from "pending" to "shipped". As may be understood by those of skill in the art of shipping, typically an LTL tracking number is not provided by the LTL carrier until the actual carrier driver arrives at the supplier locale to pick up the package to be shipped.

Additionally, the Ship Order page provides the supplier the option of adding order notes to the shipment by selecting the "Add Order Notes" link on the Ship Order Page. Typically, upon selection a separate network window will be opened that displays the Order Notes page. The supplier may either provide custom notes or access a listing of generic shipment notes. Once the shipment notes have been submitted they will be conveyed to the Customer via the order entry and visibility system or via XML.

Once the shipment is ready to be shipped the supplier selects the "Ship Order" link and the supplier is directed to a page entitled, Ship Line Items for Order XXXX, as shown in FIG. 29. This allows the supplier to alter the number of line items shipped or the quantity of any one line item. For instance in the example presented herein, assume the supplier is shipping a quantity of one from line item 1 and a quantity of 1 from line item 2. The supplier representative edits the quantities in the "ship" field and selects the "Ship Order" link to complete the ship order process. If the supplier representative desires to edit the shipment information, the supplier selects the "Edit Shipment" link and the supplier is returned to the Ship Order page, FIG. 26.

Upon selecting the "Ship Order" link, the supplier is directed to a page that generates the shipping label, as shown in FIG. 30. The shipping label can then be printed out and affixed to the shipping container. The shipping label will be indicative of the shipping service chosen and may include the tracking number of the item being shipped. Additionally, the shipping label will typically have the customer name and address, return address of the supplier, package weight and any other shipping related information printed thereon. The label page may also include instructions for printing the label, affixing the label to the container and pick-up of the package by the carrier.

Once the label has been printed and affixed and the package is deemed "shipped" the supplier has the option of returning to the Main Menu or viewing the Open Orders page. These options are performed by selecting the corresponding links on the Label page. For instance, if the supplier chooses to return to the Open Order page, the page will indicate that no open orders remain, as depicted in FIG. 31. If the supplier chooses to return to the Main Menu page and then selects the "Partial Shipment" link, the Partial Shipment page, as shown in FIG. 32, will indicate that Order Number 10010 is a partial shipment and, thus further shipment is required. If the supplier selects the Order Number in the Partial Shipment page, it will direct the supplier to the Ship Order page where the order may be shipped in full or a further partial shipment may be undertaken.

In addition, confirmation of the order being shipped, i.e., selecting the "Ship Order" link, will also prompt the order visibility system to automatically send the seller an order communication, typically either e-mail or a xml feed, alerting the seller that a shipment of the order has taken place and providing the seller with the appropriate order number, tracking number(s) and/or package weight(s). The shipment confirmation communication may also include billing information related to the cost of the products being shipped, as well as, the shipping charges. By providing for a mechanism to bill the seller for the shipping charges, immediately, upon shipment, the order entry and visibility system of the present invention eliminates the need to have the carrier bill the supplier. Additionally, a similar shipment confirmation message may be sent to the customer of the shipment.

It is also possible and within the inventive concepts herein disclosed to configure the order entry and visibility system of the present invention so that from the supplier's perspective the system interfaces with more than one seller. In this embodiment of the invention, the order listing page will typically include a column for "Sellers" that serves to identify the seller from which the order was placed. Additionally, when a seller accesses the system they will only have visibility to the status of the orders that they placed with the supplier and will be excluded from viewing other seller's orders.

Third Order Visibility Interface—the System Administrator

Figure 33:
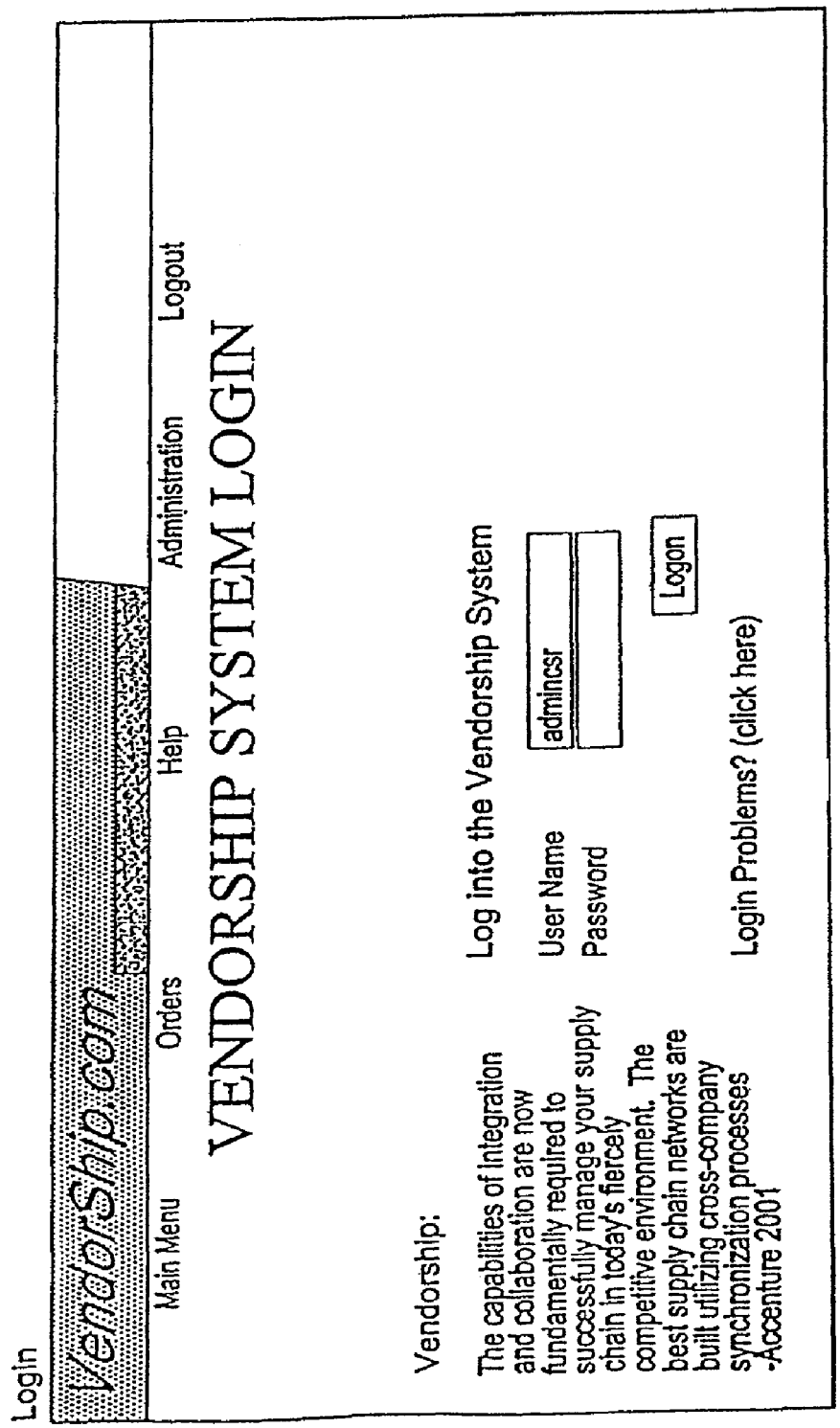

It is also possible for a third interface to be used, namely the "System Administrator Interface." As shown in FIG. 33, the system administrator, typically associated with the seller, will access the system via the system login page by entering the appropriate user name and password. In the example shown in FIG. 33 the administrator user name is "admincsr".

Figure 34:
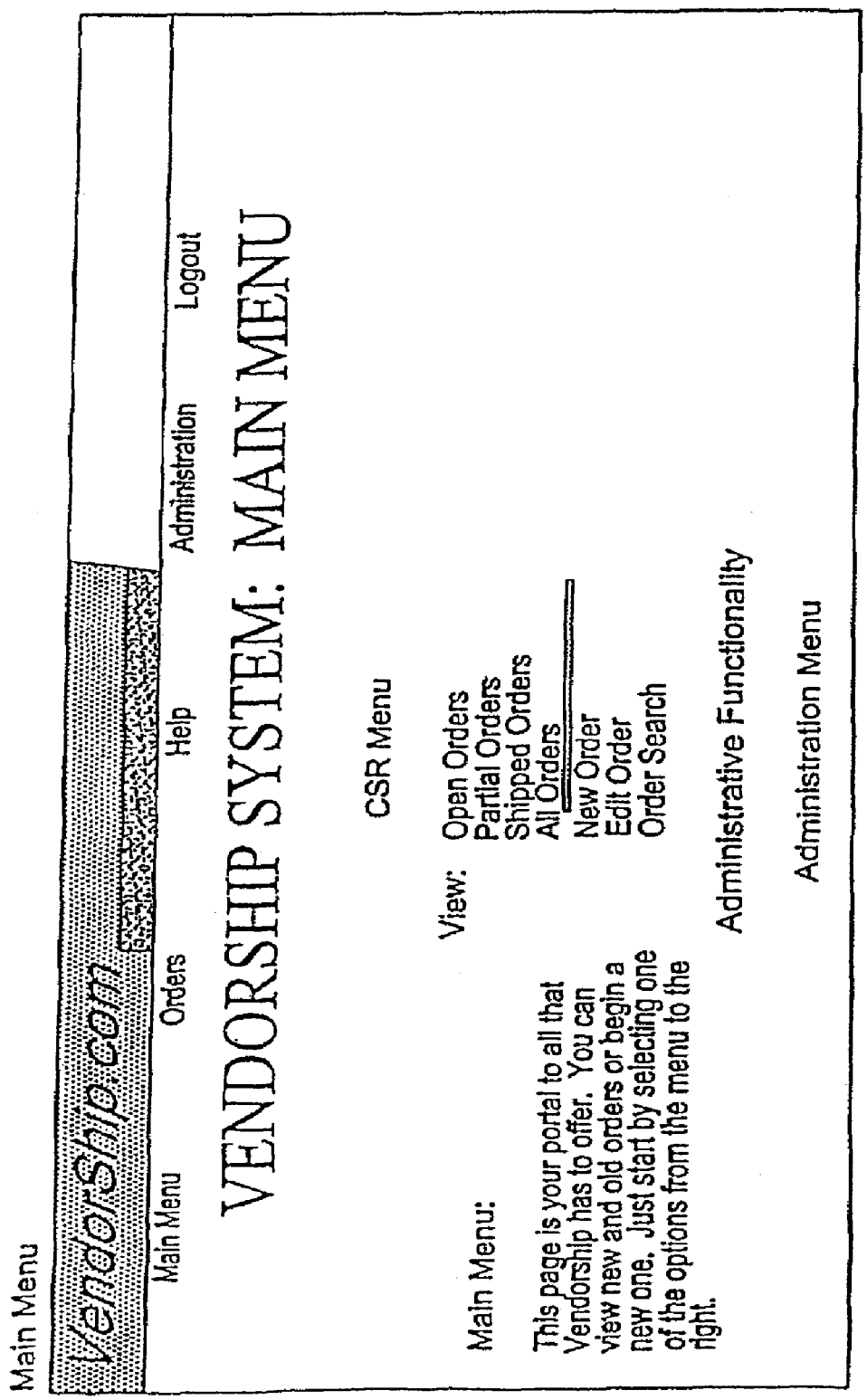

Once the login function is completed the system administrator will be directed to the system Main Menu, as shown in FIG. 34. The Main Menu allows the system administrator to access the order information previously discussed, as well as, access the Administration Menu listed under the heading of Administrative Functionality.

Figure 35:
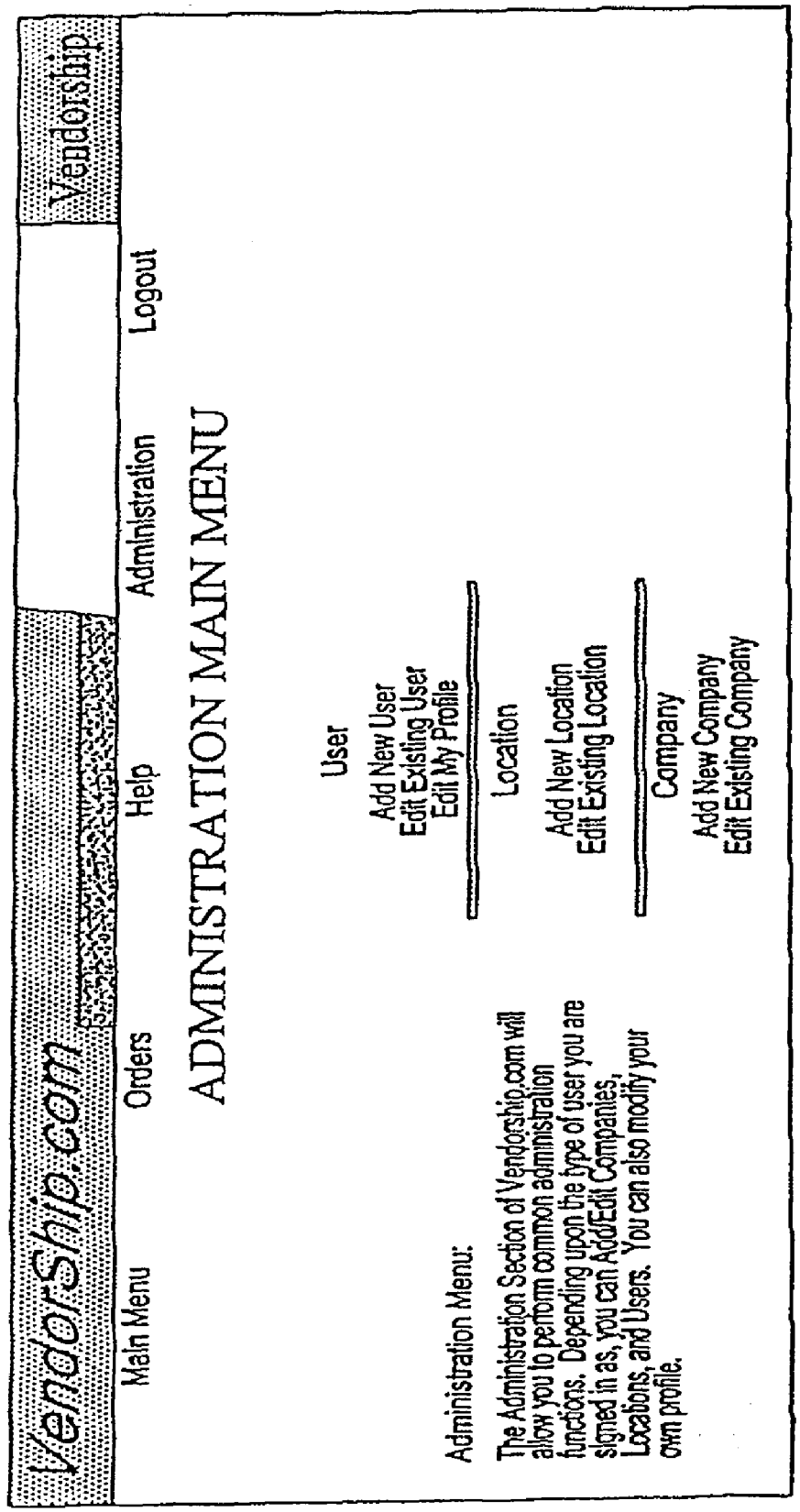
Figure 39:
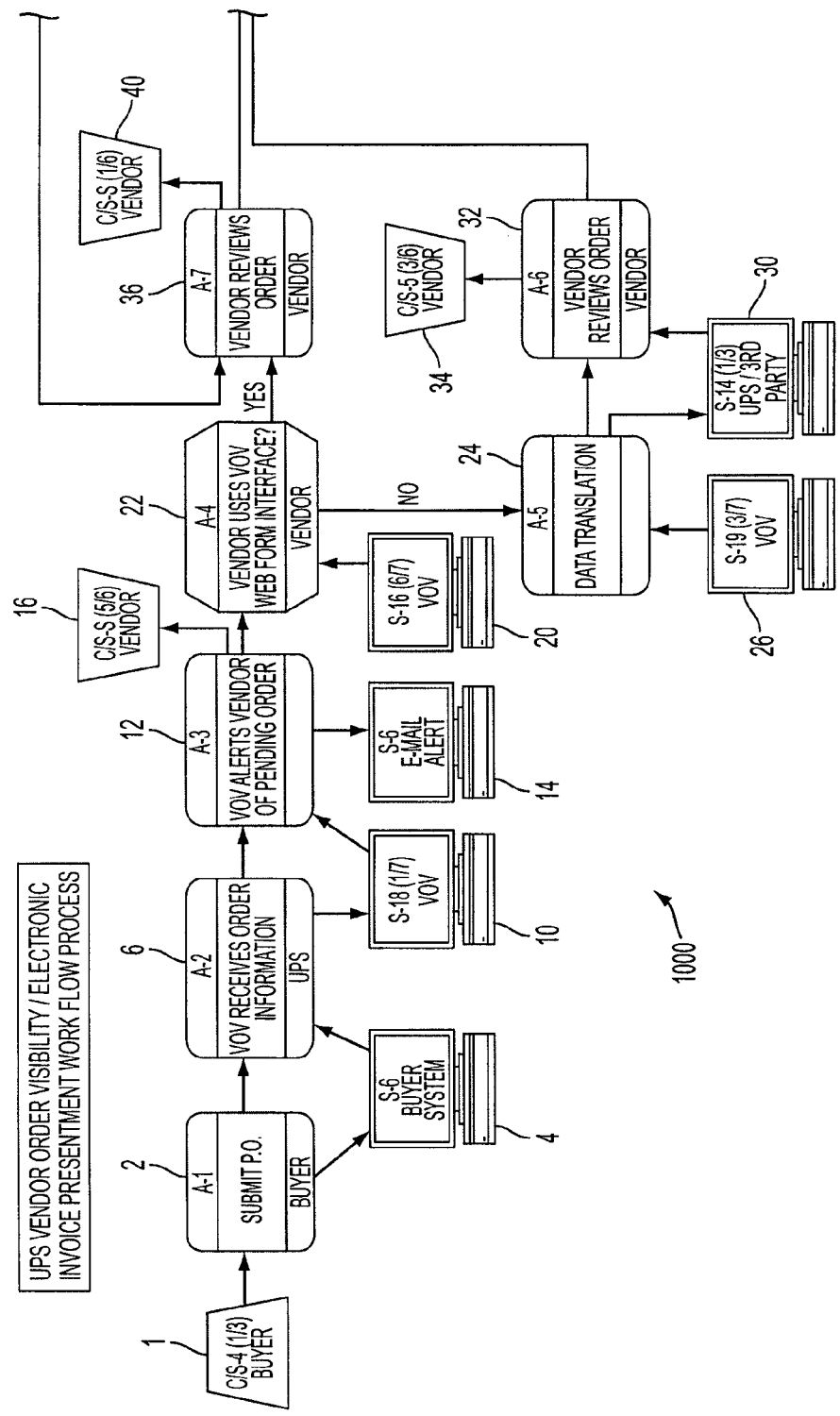
FIGS. 39-42 are various sections of an overall flowchart view of an order and payment visibility process in accordance with the present invention
Figure 40:
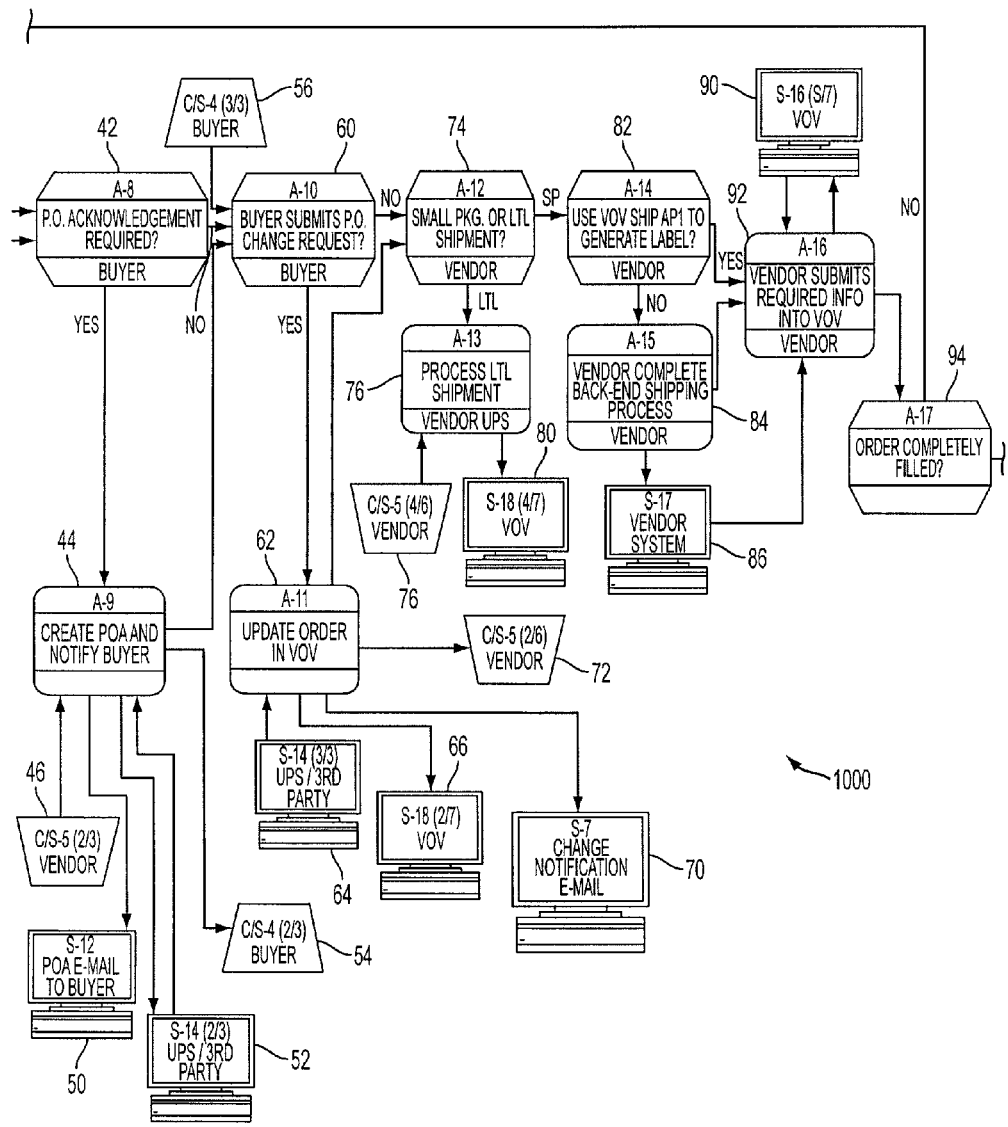

From the Administration Main Menu, as shown in FIG. 35, the system administrator has the capability to add or edit a new user, add or edit the location of a supplier or add or edit a supplier. In addition the system administrator may edit the profile of the system administrator. FIG. 36 illustrates the page that is accessed if the system administrator chooses to "add a new user". The new user will typically comprise a seller's customer service representative, a supplier representative or an additional system administrator. A new user is added by entering the information shown, including the name of the user, the login name of the user, the user's password, the user's email address and the location of the user.

The system administrator may additionally choose to "add a new location" which directs the system administrator to the page shown in FIG. 37. A pull-down menu allows the system administrator to choose an existing supplier (i.e., company) and then fill in the entries related to the new location. These entries include, a description of the new location, the new location address, new location telephone and fax numbers, a new location contact name, printer type (for the purpose of configuring the self-generated shipping label function and the appropriate seller's account numbers that are tied to the supplier.

Additionally, the system administrator will have the capability to "add a new company" by accessing the page shown in FIG. 38. The information required to add a new supplier is similar to that required to add a new supplier location, as discussed above. In addition, adding a new supplier will require the company/supplier name, a supplier code that identifies the supplier, an email address, notification method (email, XML or otherwise), company type (supplier or seller), and if the company has such, the appropriate XML or URL address.

Order and Payment Visibility Process

Another aspect of the present invention is an overall order-to-payment system 1000, which includes order entry and visibility system features integrated into customer systems, combined with data translation, purchase order acknowledgement, and purchase order change request features, all combined with electronic invoicing and payment and associated dispute resolution.

FIGS. 39-42 are sections of an overall figure, which is created by placing the figures side-by-side in numerical order with the figure legends normally viewed. This overall figure is a flow chart that shows the steps of the order and payment visibility process that begins at Step 1 in FIG. 39 and ends at Step 160 in FIG. 43.

The following are various descriptions of elements of the invention, which as will be seen in the figures are numbered in two manners; by an "A-number" manner and by a pure numerical manner. For example, Box A-1 is also numbered with the numeral 2, and represents a step in which a Buyer submits an order via an internal order entry system of web form interface to the order entry and visibility system.

At box A-1 (element 2) the process begins with the buyer 1 submitting an order to the order entry and visibility system via an internal order system of a web form interface. At box A-2 (element 6) the order entry and visibility system receives the information from the web form interface and/or via XML import. At box A-3 (element 12) the order entry and visibility system generates an email notification of a pending purchase order and sends the email to the vendor.

The "computer" icons illustrated in FIGS. 39-42, such as 4, 10 and 14, represent use of computers to access or receive information. These icons are also sometimes referred to herein as "stores" and are referenced as store 4, store 10 or store 14 etc. A buyer system 4 is shown submitting a purchase order, an order entry and visibility system 10 is shown receiving the order information and notifying the vendor of the order, and the email notification 14 generated by the order entry and visibility system is also illustrated. Computers are used herein for illustrative purposes and one of ordinary skill in the art will recognize that some or all of the steps illustrated as involving computers may be accomplished via other electronic means or manually.

The "keystone-shaped" icons such as 16 are customer and vendor tools. In other words, the keystone shapes identify "players" in the transaction. For example, element 16 has to be a yes or no from the vendor before the process will proceed to box A-4 (element 22).

At box A-4 (element 22) a determination is made whether the vendor will use the order entry and visibility system web form, or whether the vendor will require that the order(s) be exported from the order entry and visibility system and downloaded to an internal processing system such as a WMS or a shipping system. Box A-5 (element 24) shows the process of data translation. In a preferred embodiment, the order entry and visibility system can provide an XML export to the vendor. But if the vendor requires the data in another file format (i.e. EDI or flat file) then a data translation occurs to format the data to meet the vendor requirements. The data translation may be part of the order entry and visibility system, or may be performed by a third party. Box A-6 (element 32) illustrates the vendor receiving the translated data and reviewing the order through the vendor internal system. Box A-7 (element 36) shows the same step, except the vendor reviews the order through the order entry and visibility system.

Stores 20 and 26 illustrate the order entry and visibility system providing order data to the vendor. Store 20 shows data received by the vendor without data translation, and store 26 shows the order entry and visibility system providing the order data to a data translation application or system 30. Keystone icons 34 and 40 illustrate the vendor's receipt and review of the order data from the data translation application 30 and the order entry and visibility system, respectively.

In a preferred embodiment, the order and payment visibility process allows the buyer to require a purchase order acknowledgment from the vendor that specifies the terms under which the vendor will fulfill the order. At box A-8 (element 42), a determination is made whether the buyer requires a purchase order acknowledgement. If a purchase order acknowledgement is required, the process proceeds to box A-9 (element 44) where a purchase order acknowledgment is generated. The purchase order acknowledgment is preferably in the form of an email generated by the order entry and visibility system; however, the acknowledgment can also be provided to the buyer via a facsimile, phone call or an email generated by another system. The purchase order acknowledgment may be created by the vendor order entry system based upon the vendor's input into the system, or the vendor or a third party can process the purchase order and acknowledgment transaction.

Keystone icons 46 and 54 illustrate the creation of the purchase order acknowledgment through input from the vendor and the receipt of the acknowledgment by the buyer, respectively. Store 52 shows the generation of a purchase order acknowledgment, and store 50 illustrates an acknowledgment in the form of an email received by the buyer.

Depending on the terms of the vendor's acknowledgment or a buyer's changing conditions, a change request may be necessary. At box A-10 (element 60), a check is performed to determine whether the buyer has submitted a change request. A change request is preferably submitted by a buyer via the order entry and visibility system. The order within the order entry and visibility system is updated with the changed buyer requirements at box A-11 (element 62), and the vendor is notified of the change (keystone icon 72), preferably by a notification email generated by the order entry and visibility system. One of ordinary skill in the art will readily recognize that other vehicles of notifying the vendor of an order change are known in the art and may be used with the present invention.

Store 64 shows the submission of a change to an order, and store 66 illustrates the receipt and processing of the requested change order by the order entry and visibility system. Store 70 shows an email sent to a vendor with notification of the order update.

At box A-12 (element 74), the vendor determines what type of shipment is required to fulfill the order. In a preferred embodiment, information regarding a LTL shipment can be entered into the order entry and visibility system for visibility purposes. The processing of a LTL/TL shipment is illustrated at box A-13 (element 76), and shipment information is entered to maintain visibility. Store 80 represents the order and visibility system processing a LTL shipment.

In a preferred embodiment, the vendor chooses at box A-14 (element 82) whether to use the order entry and visibility system to manifest the shipment and generate a shipping or label, or whether to complete the back-end shipping process using an external system. Box A-15 (element 84) illustrates the process wherein the vendor uses a system other than the order entry and visibility system to complete the shipping process. In such case, the shipping information should nevertheless be inputted into the order entry and visibility system to maintain complete visibility. Thus, box A-16 (element 92) illustrates the vendor submitting the required shipping information into the order entry and visibility system. The information can be inputted directly into the order entry and visibility system if the vendor uses the system to manifest the shipment and generate the shipping label (illustrated by store 90), or the information can be imported from an external system if another system is used to complete the shipping process (illustrated by store 86).

Box A-17 (element 94) is a check to determine whether an order has been completely filled. In a preferred embodiment, if a vendor does not have sufficient product in stock to fulfill a complete order, the vendor has the option to fulfill a portion of the order and send a partial shipment. If it is determined at A-17 that the entire order has not been fulfilled, the process returns to the review order step when the vendor is ready to ship additional product for an order.

Figure 41:
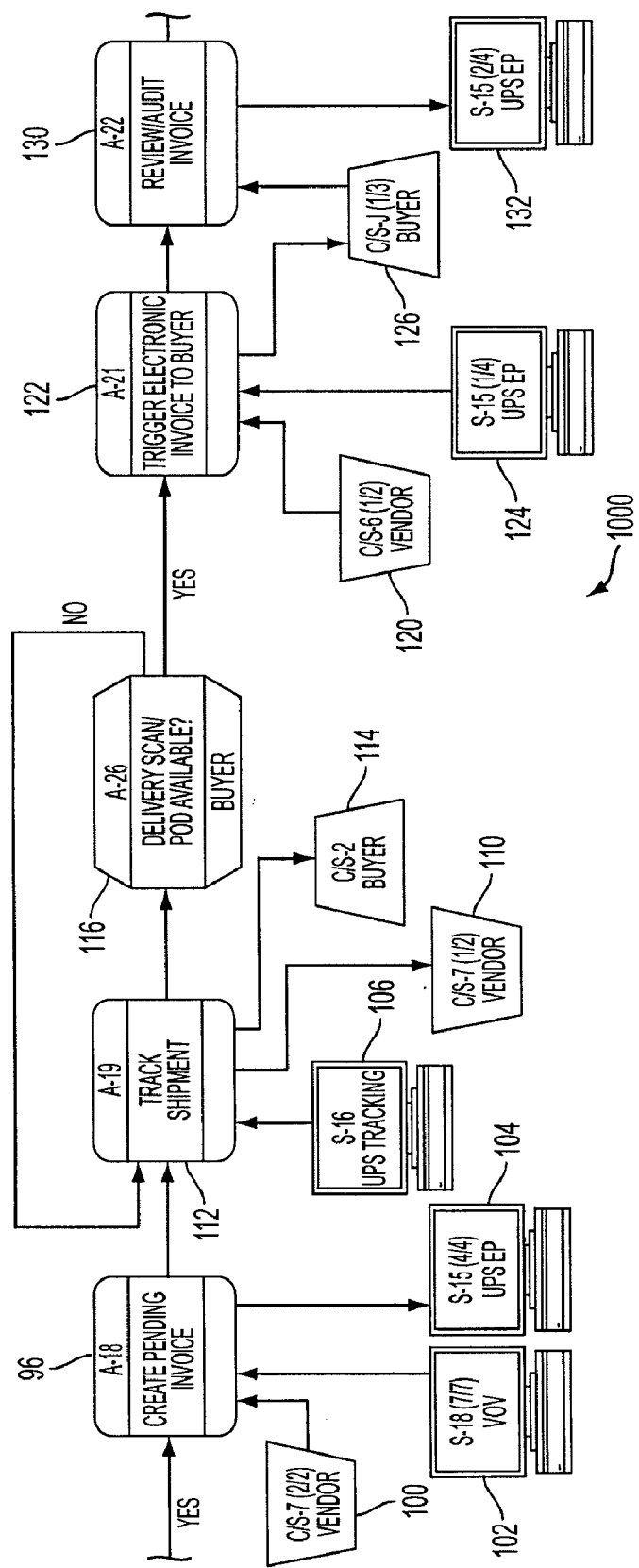
Figure 42:
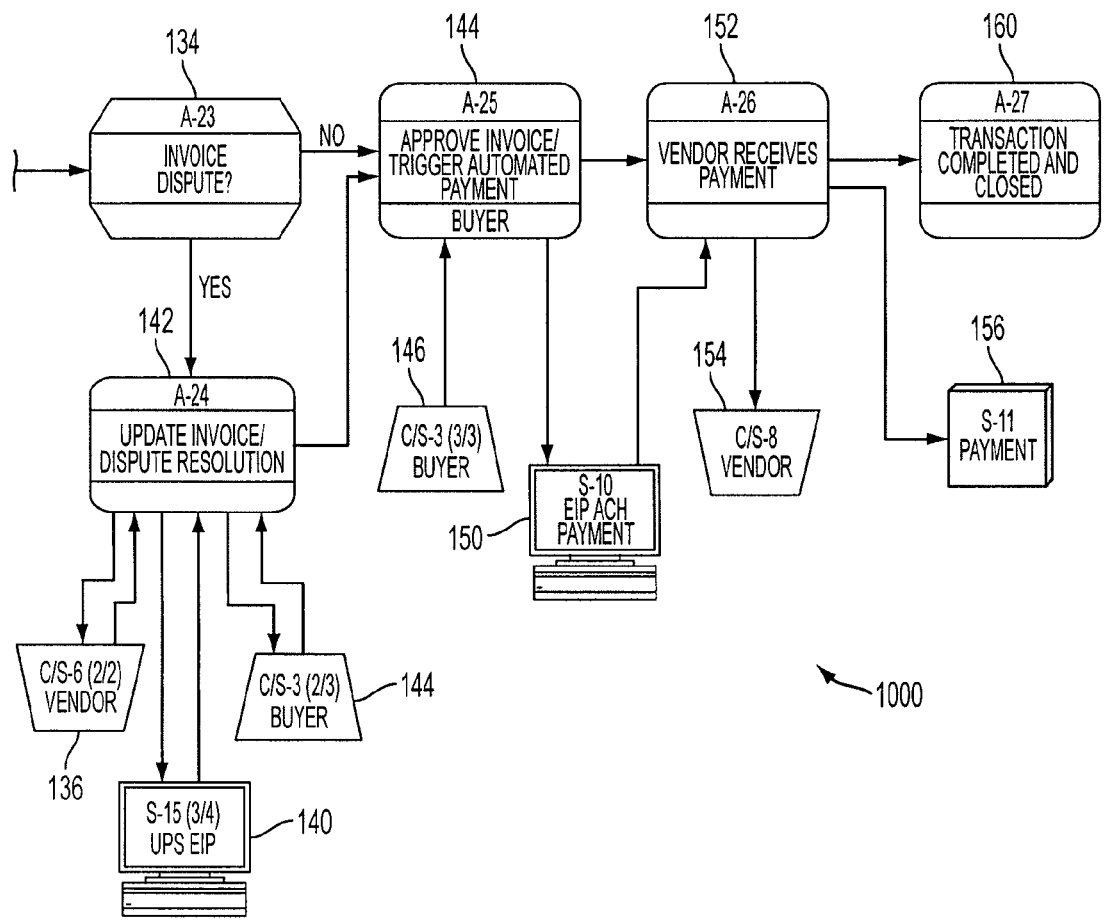

It should be understood that the description shown in FIGS. 41 and 42 are outside of a traditional order entry and visibility system. This portion of the process may be considered a financial feature of the present invention, which combines an order entry and visibility system with certain financial concepts, many of which are similar to an electronic invoice presentment (EIP) system.

At box A-18 (element 96), invoice information for the order is submitted to an EIP system (store 104), preferably by the vendor or the order entry and visibility system. The invoice remains in a "pending" state until it is approved and released to the buyer. Information for the invoice can be obtained from the vendor (keystone icon 100) or from the internal order entry and visibility system (store 102).

Box A-19 (element 112) reflects the ability of the buyer (keystone icon 114) and the vendor (keystone icon 110) to track the status of the shipment via the order entry and visibility system. In addition, the shipment may be tracked directly through a shipper tracking system 106. The receipt of a delivery confirmation and/or signature scans for all shipments within a purchase order (box A-20, element 116) triggers the generation of an electronic invoice that is sent to the buyer (box A-21, element 122). The triggering event may be automated or controlled by the vendor (keystone icon 120). In a preferred embodiment, the shipments are monitored for a delivery scan using the EIP system (store 124). Once delivery scans are captured for all shipments in a purchase order, an electronic invoice is created using the purchase order information, the POD information, and the business rules and conditions agreed upon between the buyer and vendor. Preferably, the invoice is generated automatically and submitted to the buyer (keystone icon 126) in an electronic format. But one of ordinary skill will readily recognize that some or all of these steps can include a manual check if so desired.

At box A-22 (element 130), the buyer (keystone icon 126) receives the invoice and reviews it for accuracy and completeness. At box A-23, a check is made to see whether the buyer has a dispute with the invoice. If the buyer disputes any part of the invoice, the details of the dispute are preferably inputted into the EIP system (store 132) and the vendor is automatically alerted via email or other electronic means of the dispute. Thus, in a preferred embodiment, the dispute resolution process is handled online. At box A-24 (element 142), action is taken between the buyer (keystone icon 144) and vendor (keystone icon 136) to resolve the invoice dispute. Any updates or corrections are made to the invoice via the EIP system (store 140), which keeps a complete history of the transaction and the dispute resolution. If necessary, a new electronic invoice is generated and sent to the buyer.

At box A-25 (element 144), the buyer (keystone icon 146) approves the electronic invoice through the EIP system (store 150), and the approval triggers an electronic request for payment in the form of an automated clearing house (ACH) request to the buyer's bank or to the buyer's A/P system. Alternatively, the buyer may download the invoice and elect to pay it using other means known in the art. At box A-26 (element 152), the vendor (keystone icon 154) is notified and paid (payment is represented in FIG. 43 as element 156), either directly or through its agent. Finally, box A-27 (element 160) indicates that the transaction is completed.

Therefore it may be seen that the present invention contemplate an overall order-to-payment system 1000, which includes order entry and visibility system features integrated into customer systems, combined with data translation, purchase order acknowledgement, and purchase order change request features, all combined with electronic invoicing and payment and associated dispute resolution.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for product order entry, product order visibility, and product order processing in a communications network, the system comprising:
    a seller communications device configured to:
        receive a product order from a buyer communications device; and
        submit the product order via an electronic interface, wherein the submitting includes selecting one or more suppliers from a plurality of suppliers to fulfill the product order; and
    a supplier communications device configured to:
        receive the product order transmitted from an order entry and visibility system;
        receive order fulfillment information for the product order, indicating that at least a portion of the product order has been fulfilled;
        provide the order fulfillment information for the product order to the order entry and visibility system; and
    wherein the order entry and visibility system is configured to:
        receive the order fulfillment information for the product order from the supplier communications device;
        generate an invoice for the product order in response to receiving the order fulfillment information;
        provide the buyer with an opportunity to dispute the invoice for the product order;
        resolve disputes related to the invoice and the product order; and
        provide shipping status information for the product order.

2. The system of claim 1, wherein the order entry and visibility system is further configured to communicate product order status information to an entity that submitted the product order.

3. The system of claim 1, wherein the order entry and visibility system is further configured to communicate the shipping status information to an entity that submitted the product order.

4. The system of claim 1, wherein the order entry and visibility system is further configured to provide the invoice to an entity that submitted the product order.

5. The system of claim 1, wherein the order entry and visibility system is further configured to request payment for the product order upon approval of the invoice.

6. The system of claim 5, wherein the request for payment is in the form of an automated clearing house request to a bank computing device associated with an entity that submitted the product order.

7. The system of claim 1, wherein the order entry and visibility system is further configured to request a purchase order acknowledgment from the supplier.

8. The system of claim 7, wherein the order entry and visibility system is further configured to generate the purchase order acknowledgment to an entity that submitted the product order.

9. The system of claim 8, wherein the order entry and visibility system is further configured to change the product order in response to the purchase order acknowledgment.

10. The system of claim 9, wherein the order entry and visibility system is further configured to communicate the change of the product order to the supplier communications device.

11. The system of claim 1, wherein the order entry and visibility system is further configured to generate one or more shipping labels for the product order.

12. The system of claim 1, wherein tracking the shipping status includes tracking at least one of delivery confirmation and signature scans.

* * * * *